US012581385B2

(12) United States Patent
Hasanzadezonuzy et al.

(10) Patent No.: US 12,581,385 B2
(45) Date of Patent: Mar. 17, 2026

(54) REPEATER HANDOVER DECISION BASED ON END-TO-END LINK QUALITY

(71) Applicant: QUALCOMM Incorporated, San Diego, CA (US)

(72) Inventors: Aria Hasanzadezonuzy, Somerville, NJ (US); Naeem Akl, Bridgewater, NJ (US); Navid Abedini, Basking Ridge, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 354 days.

(21) Appl. No.: 18/343,895

(22) Filed: Jun. 29, 2023

(65) Prior Publication Data

US 2025/0008404 A1 Jan. 2, 2025

(51) Int. Cl.
H04W 36/30 (2009.01)
H04W 36/00 (2009.01)

(52) U.S. Cl.
CPC ....... H04W 36/30 (2013.01); H04W 36/0058 (2018.08)

(58) Field of Classification Search
CPC . H04W 36/30; H04W 36/0058; H04W 16/28; H04W 36/0064; H04W 36/085; H04W 36/247; H04W 36/304; H04W 36/08; H04W 36/16; H04W 16/26; H04W 84/047; H04B 7/14; H04B 7/15
See application file for complete search history.

(56) References Cited

U.S. PATENT DOCUMENTS

| 2011/0080864 A1* | 4/2011 | Cai ........................ H04W 36/30 |
| | | 370/332 |
| 2012/0028627 A1 | 2/2012 | Hunzinger |
| 2012/0327794 A1* | 12/2012 | Han ...................... H04W 52/46 |
| | | 370/252 |

(Continued)

OTHER PUBLICATIONS

CMCC: "Discussion on Side Control Information to Enable NR Network-controlled Repeaters", R1-2204321, 3GPP TSG RAN WG1 #109-e 3rd Generation Partnership Project, Mobile Competence Centre, 650, Route Des Lucioles, F-06921 Sophia-Antipolis Cedex, France vol. RAN WG1, No. e-Meeting, May 9, 2022-May 20, 2022, Apr. 29, 2022, XP052153484, Paragraph [0043]—Paragraph [0048] Paragraph [0063]—Paragraph [0064] Paragraph [0068]—Paragraph [0069] Figures 5-6, 9 Pages.

(Continued)

*Primary Examiner* — Mohamed A Kamara
(74) *Attorney, Agent, or Firm* — Harrity & Harrity LLP

(57) ABSTRACT
Various aspects of the present disclosure generally relate to wireless communication. In some aspects, a network-controlled repeater (NCR) node may obtain measurements related to backhaul links between the NCR node and network nodes that forward radio frequency (RF) signals through the NCR node and to an access link between the NCR node and a user equipment (UE). The end-to-end link quality between the UE and each network node may be estimated (for example, by the NCR node or a current serving cell) in accordance with the measurements and a gain and/or transmit power used to forward RF signals, and the current serving cell may use the estimated end-to-end link quality to arrive at handover decisions for the UE.

20 Claims, 13 Drawing Sheets

(56)    References Cited

U.S. PATENT DOCUMENTS

| 2013/0143574 A1* | 6/2013 | Teyeb | .................. | H04W 72/044 |
| | | | | 455/438 |
| 2017/0230880 A1* | 8/2017 | Oroskar | .............. | H04W 36/302 |
| 2022/0030514 A1 | 1/2022 | Wu et al. | | |
| 2024/0349142 A1* | 10/2024 | Wu | ..................... | H04W 36/037 |
| 2024/0429994 A1* | 12/2024 | Moon | ................... | H04W 16/26 |
| 2025/0048245 A1* | 2/2025 | Li | ........................ | H04W 48/20 |

OTHER PUBLICATIONS

International Search Report and Written Opinion—PCT/US2024/031374—ISA/EPO—Sep. 20, 2024.

* cited by examiner

500

555

535

550

Wireless Node 520

540

545

Control Node 510

540

555

Control Component 525

Forwarding Component 530

Forwarding Node 505

545

540

Wireless Node 515

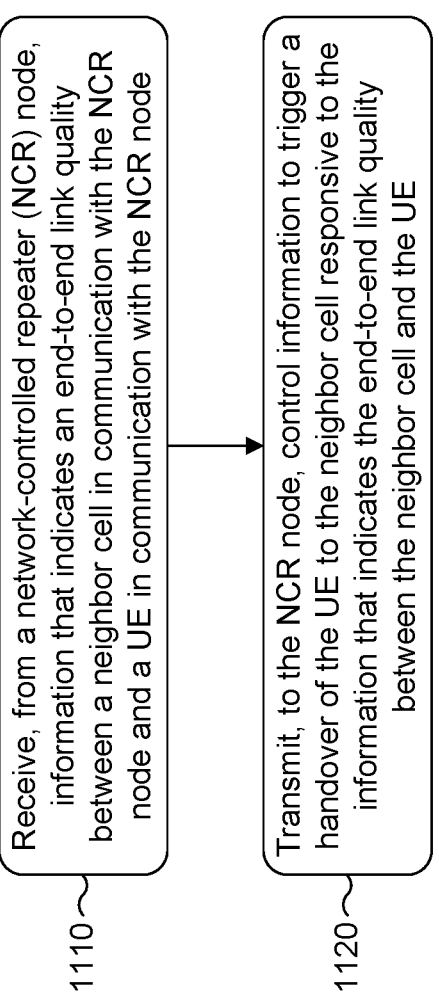

1110 — Receive, from a network-controlled repeater (NCR) node, information that indicates an end-to-end link quality between a neighbor cell in communication with the NCR node and a UE in communication with the NCR node 1120 — Transmit, to the NCR node, control information to trigger a handover of the UE to the neighbor cell responsive to the information that indicates the end-to-end link quality between the neighbor cell and the UE

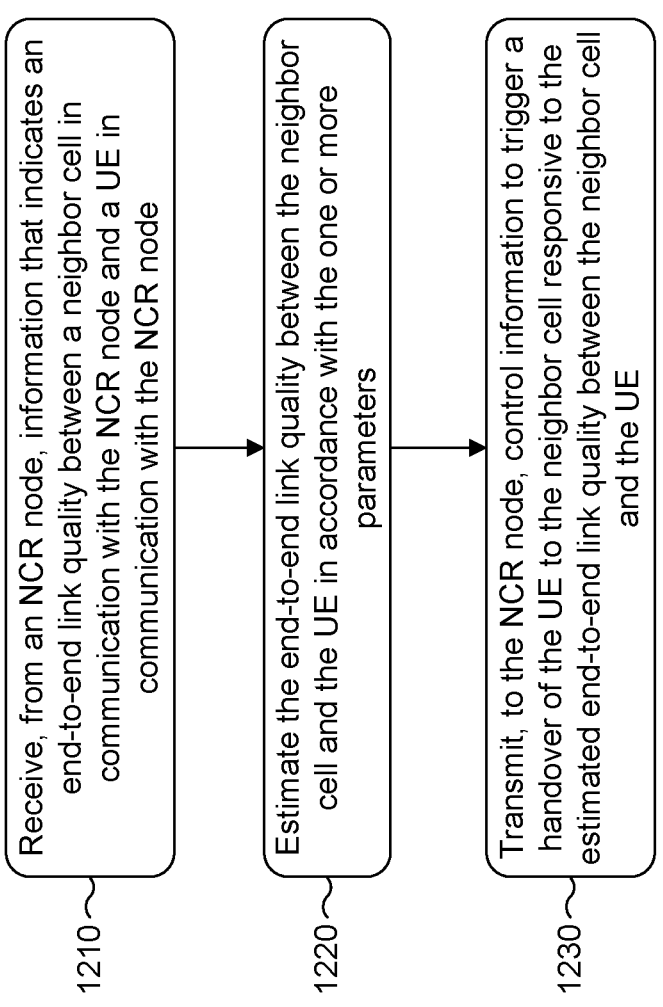

1210 — Receive, from an NCR node, information that indicates an end-to-end link quality between a neighbor cell in communication with the NCR node and a UE in communication with the NCR node 1220 — Estimate the end-to-end link quality between the neighbor cell and the UE in accordance with the one or more parameters 1230 — Transmit, to the NCR node, control information to trigger a handover of the UE to the neighbor cell responsive to the estimated end-to-end link quality between the neighbor cell and the UE

REPEATER HANDOVER DECISION BASED ON END-TO-END LINK QUALITY

FIELD OF THE DISCLOSURE

Aspects of the present disclosure generally relate to wireless communication and specifically relate to techniques, apparatuses, and methods associated with a repeater handover decision based on end-to-end link quality.

BACKGROUND

Wireless communication systems are widely deployed to provide various services that may include carrying voice, text, messaging, video, data, and/or other traffic. The services may include unicast, multicast, and/or broadcast services, among other examples. Typical wireless communication systems may employ multiple-access radio access technologies (RATs) capable of supporting communication with multiple users by sharing available system resources (for example, time domain resources, frequency domain resources, spatial domain resources, and/or device transmit power, among other examples). Examples of such multiple-access RATs include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

The above multiple-access RATs have been adopted in various telecommunication standards to provide common protocols that enable different wireless communication devices to communicate on a municipal, national, regional, or global level. An example telecommunication standard is New Radio (NR). NR, which may also be referred to as 5G, is part of a continuous mobile broadband evolution promulgated by the Third Generation Partnership Project (3GPP). NR (and other mobile broadband evolutions beyond NR) may be designed to better support Internet of things (IoT) and reduced capability device deployments, industrial connectivity, millimeter wave (mmWave) expansion, licensed and unlicensed spectrum access, non-terrestrial network (NTN) deployment, sidelink and other device-to-device direct communication technologies (for example, cellular vehicle-to-everything (V2X) communication), massive multiple-input multiple-output (MIMO), disaggregated network architectures and network topology expansions, multiple-subscriber implementations, high-precision positioning, and/or radio frequency (RF) sensing, among other examples. As the demand for mobile broadband access continues to increase, further improvements in NR may be implemented, and other radio access technologies such as 6G may be introduced, to further advance mobile broadband evolution.

In some cases, a wireless network may include one or more repeaters (for example, one or more network-controlled repeater (NCR) nodes) that may receive a radio frequency (RF) signal (for example, an analog RF signal) from a network node, amplify the RF signal, and transmit or forward the amplified RF signal to one or more UEs. For example, the one or more repeaters may include one or more analog repeaters, sometimes referred to as Layer 1 (L1) repeaters. Additionally or alternatively, the one or more repeaters may include one or more wireless transmission reception points (TRPs) acting as a distributed unit (DU) or a radio unit (RU) that communicates wirelessly with a network node acting as a central unit (CU) or an access node controller. The one or more repeaters may receive, amplify, and transmit the analog RF signals without performing analog-to-digital conversion of the analog RF signals and/or without performing any digital signal processing on the RF signals. Alternatively, the one or more repeaters may transmit the received RF signals after decoding the received RF signals and/or modifying information carried in the received RF signals. In this way, the one or more repeaters may improve network performance and/or may increase reliability by providing link diversity and by extending a communication coverage area of the network node.

In some cases, however, the use of an NCR node to relay or repeat RF signals may result in suboptimal handover decisions. For example, an NCR node may have a capability to forward RF signals to or from a first set of one or more network nodes that provide respective cells, and may be unable to forward RF signals to or from a second set of network nodes (for example, due to one or more obstructions blocking links between the NCR node and the network nodes in the second set). In such cases, a UE may connect to a cell in the first set of network nodes associated with a strongest received signal strength, and the NCR node may perform frequent measurements for reference signals transmitted by other cells that are visible to the NCR node (for example, reference signals transmitted by network nodes in the first set). In a scenario where a backhaul link between the NCR node and a current serving cell for the UE becomes weak (for example, a signal strength measurement falls below a threshold), the weak quality of the backhaul link may impact end-to-end link quality between the UE and the current serving cell. However, even if the measurements obtained by the NCR indicate that another network node in the first set of network nodes is a suitable handover candidate, the UE may need to connect directly to a cell in the second set of network nodes (for example, that are not visible to the NCR node due to obstructions or blockage) with a relatively lower end-to-end link quality because the UE cannot receive a reference signal from other network nodes that are transmitting RF signals that are repeated or relayed by the NCR node.

SUMMARY

Some aspects described herein relate to a network node. The network node may include a processing system that includes processor circuitry and memory circuitry coupled with the processor circuitry. The processing system may be configured to cause the network node to receive, from a network-controlled repeater (NCR) node, information that indicates an end-to-end link quality between a neighbor cell in communication with the NCR node and a user equipment (UE) in communication with the NCR node. The processing system may be configured to cause the network node to transmit, to the NCR node, control information to trigger a handover of the UE to the neighbor cell responsive to the information that indicates the end-to-end link quality between the neighbor cell and the UE.

Some aspects described herein relate to a network node. The network node may include a processing system that includes processor circuitry and memory circuitry coupled with the processor circuitry. The processing system may be configured to cause the network node to receive, from an NCR node, one or more parameters related to an end-to-end link quality between a neighbor cell in communication with the NCR node and a UE in communication with the NCR node. The processing system may be configured to cause the network node to estimate the end-to-end link quality between the neighbor cell and the UE in accordance with the one or more parameters. The processing system may be configured to cause the network node to transmit, to the NCR node, control information to trigger a handover of the UE to the neighbor cell responsive to the estimated end-to-end link quality between the neighbor cell and the UE.

Some aspects described herein relate to a method for wireless communication by a network node. The method may include receiving, from an NCR node, information that indicates an end-to-end link quality between a neighbor cell in communication with the NCR node and a UE in communication with the NCR node. The method may include transmitting, to the NCR node, control information to trigger a handover of the UE to the neighbor cell responsive to the information that indicates the end-to-end link quality between the neighbor cell and the UE.

Some aspects described herein relate to a method for wireless communication by a network node. The method may include receiving, from an NCR node, one or more parameters related to an end-to-end link quality between a neighbor cell in communication with the NCR node and a UE in communication with the NCR node. The method may include estimating the end-to-end link quality between the neighbor cell and the UE in accordance with the one or more parameters. The method may include transmitting, to the NCR node, control information to trigger a handover of the UE to the neighbor cell responsive to the estimated end-to-end link quality between the neighbor cell and the UE.

Some aspects described herein relate to a non-transitory computer-readable medium that stores a set of instructions for wireless communication by a network node. The set of instructions, when executed by one or more processors of the network node, may cause the network node to receive, from an NCR node, information that indicates an end-to-end link quality between a neighbor cell in communication with the NCR node and a UE in communication with the NCR node. The set of instructions, when executed by one or more processors of the network node, may cause the network node to transmit, to the NCR node, control information to trigger a handover of the UE to the neighbor cell responsive to the information that indicates the end-to-end link quality between the neighbor cell and the UE.

Some aspects described herein relate to a non-transitory computer-readable medium that stores a set of instructions for wireless communication by a network node. The set of instructions, when executed by one or more processors of the network node, may cause the network node to receive, from an NCR node, one or more parameters related to an end-to-end link quality between a neighbor cell in communication with the NCR node and a UE in communication with the NCR node. The set of instructions, when executed by one or more processors of the network node, may cause the network node to estimate the end-to-end link quality between the neighbor cell and the UE in accordance with the one or more parameters. The set of instructions, when executed by one or more processors of the network node, may cause the network node to transmit, to the NCR node, control information to trigger a handover of the UE to the neighbor cell responsive to the estimated end-to-end link quality between the neighbor cell and the UE.

Some aspects described herein relate to an apparatus for wireless communication. The apparatus may include means for receiving, from an NCR node, information that indicates an end-to-end link quality between a neighbor cell in communication with the NCR node and a UE in communication with the NCR node. The apparatus may include means for transmitting, to the NCR node, control information to trigger a handover of the UE to the neighbor cell responsive to the information that indicates the end-to-end link quality between the neighbor cell and the UE.

Some aspects described herein relate to an apparatus for wireless communication. The apparatus may include means for receiving, from an NCR node, one or more parameters related to an end-to-end link quality between a neighbor cell in communication with the NCR node and a UE in communication with the NCR node. The apparatus may include means for estimating the end-to-end link quality between the neighbor cell and the UE in accordance with the one or more parameters. The apparatus may include means for transmitting, to the NCR node, control information to trigger a handover of the UE to the neighbor cell responsive to the estimated end-to-end link quality between the neighbor cell and the UE.

Aspects of the present disclosure may generally be implemented by or as a method, apparatus, system, computer program product, non-transitory computer-readable medium, user equipment, base station, network node, network entity, wireless communication device, and/or processing system as substantially described with reference to, and as illustrated by, the specification and accompanying drawings.

The foregoing paragraphs of this section have broadly summarized some aspects of the present disclosure. These and additional aspects and associated advantages will be described hereinafter. The disclosed aspects may be used as a basis for modifying or designing other aspects for carrying out the same or similar purposes of the present disclosure. Such equivalent aspects do not depart from the scope of the appended claims. Characteristics of the aspects disclosed herein, both their organization and method of operation, together with associated advantages, will be better understood from the following description when considered in connection with the accompanying drawings.

BRIEF DESCRIPTION OF THE DRAWINGS

The appended drawings illustrate some aspects of the present disclosure, but are not limiting of the scope of the present disclosure because the description may enable other aspects. Each of the drawings is provided for purposes of illustration and description, and not as a definition of the limits of the claims. The same or similar reference numbers in different drawings may identify the same or similar elements.

FIGS. 11-12 are flowcharts illustrating example processes performed, for example, by a network node in accordance with the present disclosure.

DETAILED DESCRIPTION

Figure 1:
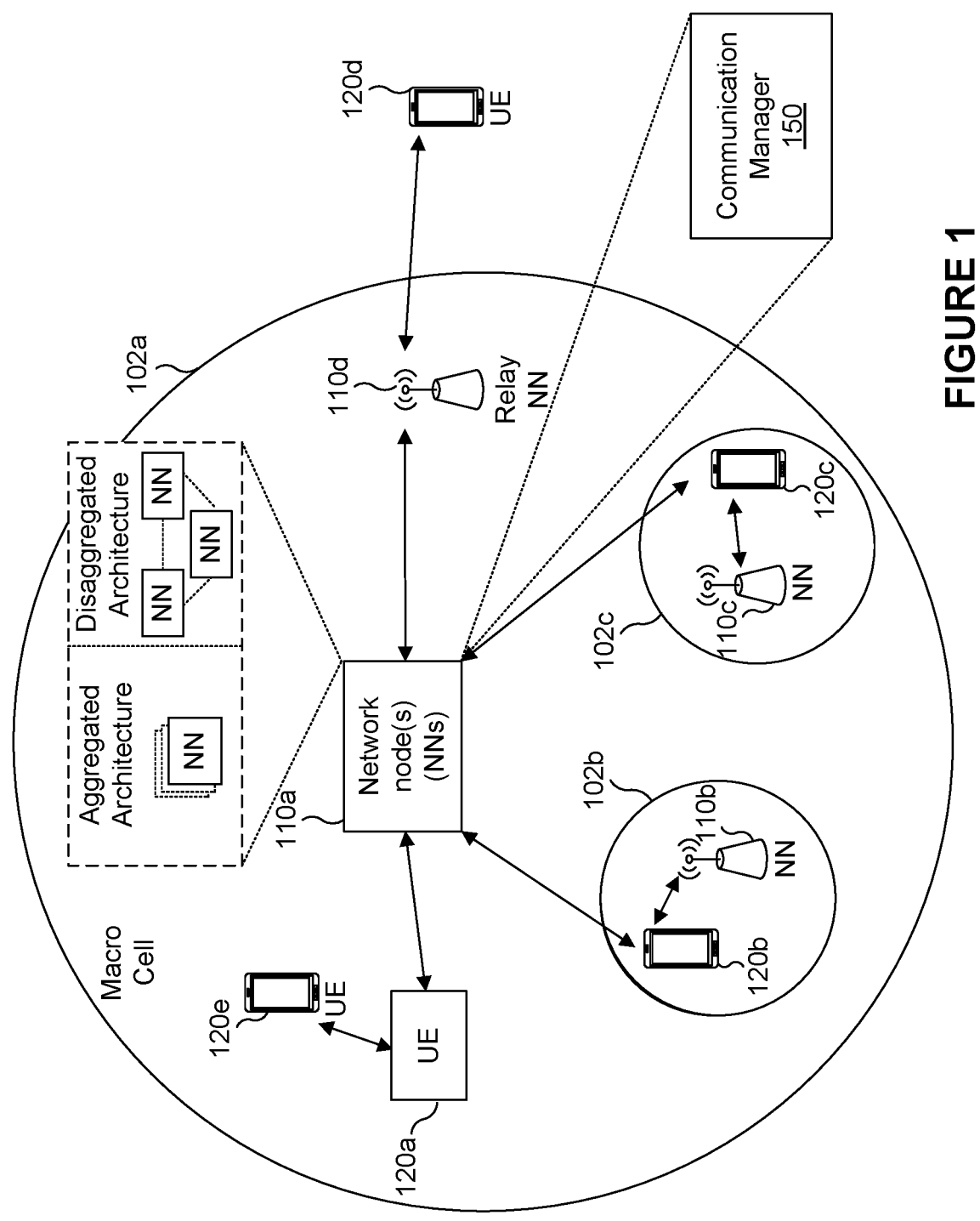
FIG. 1 is a diagram illustrating an example of a wireless network in accordance with the present disclosure.

Various aspects of the present disclosure are described hereinafter with reference to the accompanying drawings. However, aspects of the present disclosure may be embodied in many different forms and is not to be construed as limited to any specific aspect illustrated by or described with reference to an accompanying drawing or otherwise presented in this disclosure. Rather, these aspects are provided so that this disclosure will be thorough and complete, and will fully convey the scope of the disclosure to those skilled in the art. One skilled in the art may appreciate that the scope of the disclosure is intended to cover any aspect of the disclosure disclosed herein, whether implemented independently of or in combination with any other aspect of the disclosure. For example, an apparatus may be implemented or a method may be practiced using various combinations or quantities of the aspects set forth herein. In addition, the scope of the disclosure is intended to cover an apparatus having, or a method that is practiced using, other structures and/or functionalities in addition to or other than the structures and/or functionalities with which various aspects of the disclosure set forth herein may be practiced. Any aspect of the disclosure disclosed herein may be embodied by one or more elements of a claim.

Several aspects of telecommunication systems will now be presented with reference to various methods, operations, apparatuses, and techniques. These methods, operations, apparatuses, and techniques will be described in the following detailed description and illustrated in the accompanying drawings by various blocks, modules, components, circuits, steps, processes, or algorithms (collectively referred to as "elements"). These elements may be implemented using hardware, software, or a combination of hardware and software. Whether such elements are implemented as hardware or software depends upon the particular application and design constraints imposed on the overall system.

Various aspects relate generally to techniques for making a handover decision in cases where a user equipment (UE) is connected to a network-controlled repeater (NCR) node in accordance with an estimated end-to-end link quality between the UE and one or more network nodes connected to the NCR node. Some aspects more specifically relate to an NCR node that may obtain measurements related to backhaul links between the NCR node and the one or more network nodes and one or more measurements related to an access link between the NCR node and the UE, which may be used to estimate the end-to-end link quality between the UE and each network node that is connected to the NCR node. For example, in some aspects, the NCR node may use the measurements related to the backhaul links and the access link in addition to information related to a gain and/or transmit power that the NCR node is using to forward radio frequency (RF) signals to estimate the end-to-end link quality between the UE and each network node connected to the NCR node. The NCR node may then send information indicating the estimated end-to-end link quality between the UE and each network node to a current serving cell for the UE, which may use the estimated end-to-end link quality between the UE and each network node to arrive at handover decisions for the UE. Additionally or alternatively, the NCR node may send information indicating the measurements related to the backhaul link quality and the access link quality in addition to information related to the gain and/or transmit power used to forward RF signals to the current serving cell for the UE, which may use the information to estimate the end-to-end link quality between the UE and each network node to arrive at handover decisions for the UE.

Particular aspects of the subject matter described in this disclosure can be implemented to realize one or more of the following potential advantages. In some examples, the described techniques can be used to make a handover decision for a UE that considers the end-to-end link quality between the UE and a candidate neighbor cell that uses an NCR node to forward RF signals to the UE. For example, the end-to-end link quality for a particular network node may generally depend on a link quality associated with a backhaul link between a network node and the NCR node and a link quality associated with an access link between the NCR node and the UE. Accordingly, because the NCR node is performing frequent measurements of the backhaul link and the access link, the NCR node may have access to sufficient information to estimate the end-to-end link quality between the UE and each candidate network node that forwards RF signals through the NCR node. In this way, rather than restricting handovers to one or more network nodes from which the UE can directly receive a reference signal, which may potentially offer poorer end-to-end link quality than a network node that is forwarding RF signals through the NCR node, the frequent measurements performed by the NCR node may enable handover decisions in accordance with end-to-end link quality estimates with low signaling overhead and low latency (for example, relative to other handover schemes in which the UE performs cell measurements that are reported to the network and/or other handover schemes that do not consider variations in gain or transmit power that the NCR node uses for different cells).

Multiple-access radio access technologies (RATs) have been adopted in various telecommunication standards to provide common protocols that enable different wireless communication devices to communicate on a municipal, national, regional, or global level. For example, New Radio (NR), also be referred to as 5G, is part of a continuous mobile broadband evolution promulgated by the Third Generation Partnership Project (3GPP) to better support Internet of things (IoT) and reduced capability (RedCap) device deployments, industrial connectivity, millimeter wave (mm-Wave) expansion, licensed and unlicensed spectrum access, non-terrestrial network (NTN) deployment, sidelink and other device-to-device direct communication technologies, massive multiple-input multiple-output (MIMO), disaggregated network architectures and network topology expansions, multiple-subscriber implementations, high-precision positioning, and/or radio frequency (RF) sensing, among other examples. As the demand for mobile broadband access continues to increase, further improvements in NR may be implemented, and other RATs such as 6G may be introduced, to further advance mobile broadband evolution (for example, to support full-duplexing or other advanced duplexing schemes, artificial intelligence or machine learning, cooperative communications, massive and ambient IoT, enhanced modulation and coding, new frequency bands, overlapping spectrum use, and extended reality (XR), among other examples).

FIG. 1 is a diagram illustrating an example of a wireless communication network 100 in accordance with the present disclosure. The wireless communication network 100 may be or may include elements of a 5G (or NR) network or a 6G network, among other examples. The wireless communication network 100 may include multiple network nodes 110 (also referred to as network entities), shown as a network node (NN) 110a, a network node 110b, a network node 110c, and a network node 110d. The network nodes 110 may support communications with multiple UEs 120, shown as a UE 120a, a UE 120b, a UE 120c, a UE 120d, and a UE 120c.

A network node 110 may include one or more devices or systems that enable communication between a UE 120 and one or more components of the wireless communication network 100. A network node 110 may be, may include, or may be referred to as, an NR network node, a 5G network node, a 6G network node, a Node B, an eNB (for example, in 4G), a gNB (for example, in 5G), an access point (AP), a transmission reception point (TRP), a mobility element of a network, a core network node, a network element, a network equipment, and/or another type of device or devices included in a radio access network (RAN).

A network node 110 may be implemented as a single physical node (for example, a single physical structure) or may be implemented as two or more physical nodes (for example, two or more distinct physical structures). For example, a network node 110 may be a device or system that implements part of a radio protocol stack, a device or system that implements a full protocol stack (such as a full gNB protocol stack), or a collection of devices or systems that collectively implement the full protocol stack. For example, and as shown, a network node 110 may be an aggregated network node, meaning that the network node 110 may implement a full radio protocol stack that is physically and logically integrated within a single node (for example, a single physical structure) in the wireless communication network 100. For example, an aggregated network node 110 may consist of a single standalone base station or a single TRP that uses a full radio protocol stack to enable or facilitate communication between a UE 120 and a core network of the wireless communication network 100.

Alternatively, and as also shown, a network node 110 may be a disaggregated network node (sometimes referred to as a disaggregated base station), meaning that the network node 110 may use a protocol stack that is physically distributed and/or logically distributed among two or more nodes in the same geographic location or in different geographic locations. In some deployments, disaggregated network nodes 110 may be used in an integrated access and backhaul (IAB) network, in an open radio access network (O-RAN), such as the network configuration sponsored by the O-RAN Alliance, or in a virtualized radio access network (vRAN), also known as a cloud radio access network (C-RAN), to facilitate scaling of communication systems by separating base station functionality into multiple units that can be individually deployed.

The network nodes 110 of the wireless communication network 100 may include one or more central units (CUs), one or more distributed units (DUs), and/or one or more radio units (RUs). A CU may host one or more higher layer control functions, such as radio resource control (RRC) functions, packet data convergence protocol (PDCP) functions, and/or service data adaptation protocol (SDAP) functions, among other examples. A DU may host one or more of a radio link control (RLC) layer, a medium access control (MAC) layer, and/or one or more high physical (PHY) layers depending, at least in part, on a functional split, such as a functional split defined by the Third Generation Partnership Project (3GPP). In some examples, a DU also may host one or more low PHY layer functions, such as a fast Fourier transform (FFT), an inverse FFT (iFFT), beamforming, physical random access channel (PRACH) extraction and filtering, and/or scheduling of resources for one or more UEs 120, among other examples. An RU may host RF processing functions or low PHY layer functions, such as an FFT, an iFFT, beamforming, or PRACH extraction and filtering, among other examples, according to a functional split, such as a lower layer functional split. In such an architecture, each RU can be operated to handle over the air (OTA) communication with one or more UEs 120.

In some aspects, a network node 110 may include a combination of one or more CUs, one or more DUs, and/or one or more RUs. Additionally or alternatively, a network node 110 may include one or more Near-Real Time (Near-RT) RAN Intelligent Controllers (RICs) and/or one or more Non-Real Time (Non-RT) RICs. In some examples, a CU, a DU, and/or an RU may be implemented as a virtual unit, such as a virtual central unit (VCU), a virtual distributed unit (VDU), or a virtual radio unit (VRU), among other examples. A virtual unit may be implemented as a virtual network function, such as associated with a cloud deployment.

In some examples, a network node 110 may be, may include, or may operate as an RU, a TRP, or a base station that communicates with one or more UEs 120 via a radio access link (which may be referred to as a "Uu" link). The radio access link may include a downlink and an uplink. "Downlink" (or "DL") refers to a communication direction from a network node 110 to a UE 120, and "uplink" (or "UL") refers to a communication direction from a UE 120 to a network node 110. Downlink channels may include one or more control channels and one or more data channels. A downlink control channel may be used to transmit downlink control information (for example, scheduling information, reference signals, and/or configuration information) from a network node 110 to a UE 120. A downlink data channel may be used to transmit downlink data (for example, user data associated with a UE 120) from a network node 110 to a UE 120. Downlink control channels may include one or more physical downlink control channels (PDCCHs), and downlink data channels may include one or more physical downlink shared channels (PDSCHs). Uplink channels may similarly include one or more control channels and one or more data channels. An uplink control channel may be used to transmit uplink control information (for example, reference signals and/or feedback corresponding to one or more downlink transmissions) from a UE 120 to a network node 110. An uplink data channel may be used to transmit uplink data (for example, user data associated with a UE 120) from a UE 120 to a network node 110. Uplink control channels may include one or more physical uplink control channels (PUCCHs), and uplink data channels may include one or more physical uplink shared channels (PUSCHs). The downlink and the uplink may each include a set of resources on which the network node 110 and the UE 120 may communicate.

In various examples, some of the network nodes 110 and the UEs 120 of the wireless communication network 100 may be configured for full-duplex operation in addition to half-duplex operation. A network node 110 or a UE 120 operating in a half-duplex mode may perform only one of transmission or reception during particular time resources, such as during particular slots, symbols, or other time periods. Half-duplex operation may involve time-division duplexing (TDD), in which DL transmissions of the network node 110 and UL transmissions of the UE 120 do not occur in the same time resources (that is, the transmissions do not overlap in time). In contrast, a network node 110 or a UE 120 operating in a full-duplex mode can transmit and receive communications concurrently (for example, in the same time resources). By operating in a full-duplex mode, network nodes 110 and/or UEs 120 may generally increase the capacity of the network and the radio access link. In some examples, full-duplex operation may involve frequency-division duplexing (FDD), in which DL transmissions of the network node 110 are performed in a first frequency band or on a first component carrier and transmissions of the UE 120 are performed in a second frequency band or on a second component carrier different than the first frequency band or the first component carrier, respectively. In some examples, full-duplex operation may be enabled for a UE 120 but not for a network node 110. For example, a UE 120 may simultaneously transmit an UL transmission to a first network node 110 and receive a DL transmission from a second network node 110 in the same time resources. In some other examples, full-duplex operation may be enabled for a network node 110 but not for a UE 120. For example, a network node 110 may simultaneously transmit a DL transmission to a first UE 120 and receive an UL transmission from a second UE 120 in the same time resources. In some other examples, full-duplex operation may be enabled for both a network node 110 and a UE 120.

In some examples, the UE 120 and the network node 110 may perform MIMO communication. "MIMO" generally refers to transmitting or receiving multiple signals (such as multiple layers or multiple data streams) simultaneously over the same time and frequency resources. MIMO techniques generally exploit multipath propagation. MIMO may be implemented using various spatial processing or spatial multiplexing operations. In some examples, MIMO may support simultaneous transmission to multiple receivers, referred to as multi-user MIMO (MU-MIMO). Some radio access technologies (RATs) may employ advanced MIMO techniques, such as mTRP operation (including redundant transmission or reception on multiple TRPs), reciprocity in the time domain or the frequency domain, single-frequency-network (SFN) transmission, or non-coherent joint transmission (NC-JT). Furthermore, in a wireless local area network (WLAN), one or more access points (APs) and one or more stations (STAs) that include multiple antennas also may support spatial multiplexing, which may be used to increase the spectral efficiency and the resultant throughput of a transmission. To implement spatial multiplexing, the transmitting device divides the data stream into a quantity of separate, independent spatial streams that are then separately encoded and transmitted in parallel via the multiple transmit antennas.

As described above, in some aspects, the wireless communication network 100 may be, may include, or may be included in, an IAB network. In an IAB network, at least one network node 110 is an anchor network node that communicates with a core network. An anchor network node 110 may also be referred to as an IAB donor (or "IAB-donor"). The IAB donor 110 may connect to the core network via a wired backhaul link. For example, an Ng interface of the IAB donor 110 may terminate at the core network. Additionally or alternatively, an IAB donor 110 may connect to one or more devices of the core network that provide a core access and mobility management function (AMF). An IAB network also generally includes multiple non-anchor network nodes 110, which may also be referred to as relay network nodes or simply as IAB nodes (or "IAB-nodes"). Each IAB node 110 may communicate directly with the IAB donor 110 via a wireless backhaul link to access the core network, or may communicate indirectly with the IAB donor 110 via one or more other IAB nodes 110 and associated wireless backhaul links that form a backhaul path to the core network. Some IAB donors 110 or other IAB nodes 110 may also communicate directly with one or more UEs 120 via wireless access links that carry access traffic. In some examples, network resources for wireless communication (such as time resources, frequency resources, and/or spatial resources) may be shared between access links and backhaul links.

An IAB donor 110 may include a CU, which may perform access node controller (ANC) functions and/or AMF functions. The CU may configure a DU of the IAB donor 110 and/or may configure one or more IAB nodes 110 (for example, a mobile termination (MT) function and/or a DU function of each of the IAB nodes) that connect to the core network via the IAB donor 110. Thus, a CU of an IAB donor 110 may control and/or configure the entire IAB network (or a portion thereof) that connects to the core network via the IAB donor 110, such as by using control messages and/or configuration messages (for example, an RRC configuration message or an F1 application protocol (F1AP) message).

An IAB node 110 other than an IAB donor 110 also may control and/or schedule communications for a second IAB node 110 (for example, when the IAB node provides DU functions for the MT functions of the second IAB node). In such deployments, the first IAB node 110 may be referred to as a parent IAB node of the second IAB node 110, and the second IAB node 110 may be referred to as a child IAB node of the first IAB node 110. Similarly, a child IAB node of the second IAB node 110 may be referred to as a grandchild IAB node of the first IAB node 110. A DU function of a parent IAB node may control and/or schedule communications for child IAB nodes of the parent IAB node. In some examples, a DU function may exercise limited control over communications of a grandchild node, such as via indication of soft resources or restricted beams at a child node associated with the grandchild node. In some examples, an IAB node 110 that implements a DU function may be referred to as a scheduling node or a scheduling component, and an IAB node 110 that implements an MT function may be referred to as a scheduled node or a scheduled component.

In some examples, any network node 110 that relays communications may be referred to as a relay network node, a relay station, or simply as a relay. A relay may receive a transmission of a communication from an upstream station (for example, another network node 110 or a UE 120) and transmit the communication to a downstream station (for example, a UE 120 or another network node 110). In this case, the wireless communication network 100 may include or be referred to as a "multi-hop network." In the example shown in FIG. 1, the network node 110d (for example, a relay network node) may communicate with the network node 110*a* (for example, a macro network node) and the UE 120*d* in order to facilitate communication between the network node 110*a* and the UE 120*d*. Additionally or alternatively, a UE 120 may be or may operate as a relay station that can relay transmissions to or from other UEs 120. A UE 120 that relays communications may be referred to as a UE relay or a relay UE, among other examples.

In some examples, a relay network node 110 may include an electromagnetic radiation reflective component that can be used to relay (for example, reflect) signals from a first other network node 110 to a second other network node 110 or a UE 120. Such a relay network node 110 can include, for example, a radio frequency reflection array configured to perform radio frequency reflection functions. The electromagnetic radiation reflective array can be, for example, a reconfigurable intelligent surface (RIS) (which also can be referred to as an intelligent reflective surface (IRS)).

The UEs 120 may be physically dispersed throughout the wireless communication network 100, and each UE 120 may be stationary or mobile. A UE 120 may be, may include, or may be included in an access terminal, another terminal, a mobile station, or a subscriber unit. A UE 120 may be, include, or be coupled with a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses, a smart wristband, and/or smart jewelry, such as a smart ring or a smart bracelet), an entertainment device (for example, a music device, a video device, and/or a satellite radio), an extended reality (XR) device, a vehicular component or sensor, a smart meter or sensor, industrial manufacturing equipment, a Global Navigation Satellite System (GNSS) device (such as a Global Positioning System device or another type of positioning device), a UE function of a network node, and/or any other suitable device or function that may communicate via a wireless medium.

A UE 120 may include or may be included in a housing that houses components associated with the UE 120, such as one or more processor components and/or one or more memory components. One or more of the processor components may be coupled with one or more of the memory components and/or other components. For example, the processor components (for example, one or more processors) and the memory components (for example, one or more memories) may be operatively coupled, communicatively coupled, electronically coupled, or electrically coupled with one another. In some examples, a UE 120 include one or more chips, system-on-chips (SoCs), chipsets, packages, or devices that individually or collectively constitute or comprise a processing system. The processing system includes processor (or "processing") circuitry in the form of one or multiple processors, microprocessors, processing units (such as central processing units (CPUs), graphics processing units (GPUs) or digital signal processors (DSPs)), processing blocks, application-specific integrated circuits (ASIC), programmable logic devices (PLDs) (such as field programmable gate arrays (FPGAs)), or other discrete gate or transistor logic or circuitry (all of which may be generally referred to herein individually as "processors" or collectively as "the processor" or "the processor circuitry"). One or more of the processors may be individually or collectively configurable or configured to perform various functions or operations described herein. The processing system may further include memory circuitry in the form of one or more memory devices, memory blocks, memory elements or other discrete gate or transistor logic or circuitry, each of which may include tangible storage media such as random-access memory (RAM) or read-only memory (ROM), or combinations thereof (all of which may be generally referred to herein individually as "memories" or collectively as "the memory" or "the memory circuitry"). One or more of the memories may be coupled with one or more of the processors and may individually or collectively store processor-executable code that, when executed by one or more of the processors, may configure one or more of the processors to perform various functions or operations described herein. Additionally or alternatively, in some examples, one or more of the processors may be preconfigured to perform various functions or operations described herein without requiring configuration by software. The processing system may further include or be coupled with one or more modems (such as a Wi-Fi (for example, IEEE compliant) modem or a cellular (for example, 3GPP 4G LTE, 5G, or 6G compliant) modem). In some implementations, one or more processors of the processing system include or implement one or more of the modems. The processing system may further include or be coupled with multiple radios (collectively "the radio"), multiple RF chains or multiple transceivers, each of which may in turn be coupled with one or more of multiple antennas. In some implementations, one or more processors of the processing system include or implement one or more of the radios, RF chains or transceivers.

Some UEs 120 may be considered machine-type communication (MTC) or evolved or enhanced machine-type communication (eMTC) UEs (or further enhanced eMTC (feMTC), or enhanced feMTC (efeMTC), or further evolutions thereof, all of which may be simply referred to as "MTC"). An MTC UE may be, may include, or may be included in or coupled with a robot, an unmanned aerial vehicle, a remote device, a sensor, a meter, a monitor, and/or a location tag. Some UEs 120 may be considered IoT devices and/or may be implemented as NB-IoT (narrowband IoT) devices. An IoT UE or NB-IoT device may be, may include, or may be included in or coupled with an industrial machine, an appliance, a refrigerator, a doorbell camera device, a home automation device, and/or a light fixture, among other examples. Some UEs 120 may be considered Customer Premises Equipment, which may include telecommunications devices that are installed at a customer location (such as a home or office) to enable access to a service provider's network (such as included in or in communication with the wireless communication network 100).

In some examples, two or more UEs 120 (for example, shown as UE 120*a* and UE 120*c*) may communicate directly with one another using sidelink communications (for example, without communicating by way of a network node 110 as an intermediary). As an example, the UE 120*a* may directly transmit data, control information, or other signaling as a sidelink communication to the UE 120*c*. This is in contrast to, for example, the UE 120*a* first transmitting data in an UL communication to a network node 110, which then transmits the data to the UE 120*e* in a DL communication. In various examples, the UEs 120 may communicate using peer-to-peer (P2P) communication protocols, device-to-device (D2D) communication protocols, vehicle-to-everything (V2X) communication protocols (which may include vehicle-to-vehicle (V2V) protocols, vehicle-to-infrastructure (V2I) protocols, and/or vehicle-to-pedestrian (V2P) protocols), and/or mesh network communication protocols.

In some deployments and configurations, a network node 110 may schedule and/or allocate resources for sidelink communications between UEs 120 in the wireless communication network 100. In some other deployments and configurations, a UE 120 (instead of a network node 110) may perform, or collaborate or negotiate with one or more other UEs to perform, scheduling operations, resource selection operations, and/or other operations for sidelink communications.

Downlink and uplink resources may include time domain resources (frames, subframes, slots, and/or symbols), frequency domain resources (frequency bands, frequency carriers, subcarriers, resource blocks, and/or resource elements), and/or spatial domain resources (particular transmit directions and/or beam parameters). Frequency domain resources of some bands may be subdivided into bandwidth parts (BWPs). A BWP may be a continuous block of frequency domain resources (for example, a continuous block of resource blocks) that are allocated for one or more UEs 120. A UE 120 may be configured with both an uplink BWP and a downlink BWP (where the uplink BWP and the downlink BWP may be the same BWP or different BWPs). A BWP may be dynamically configured (for example, by a network node 110 transmitting a downlink control information (DCI) configuration to the one or more UEs 120) and/or reconfigured, which means that a BWP can be adjusted in real-time (or near-real-time) based on changing network conditions in the wireless communication network 100 and/or based on the specific requirements of the one or more UEs 120. This enables more efficient use of the available frequency domain resources in the wireless communication network 100 because fewer frequency domain resources may be allocated to a BWP for a UE 120 (which may reduce the quantity of frequency domain resources that a UE 120 is required to monitor), leaving more frequency domain resources to be spread across multiple UEs 120. Thus, BWPs may also assist in the implementation of lower-capability UEs 120 by facilitating the configuration of smaller bandwidths for communication by such UEs 120.

As indicated above, a BWP may be configured as a subset or a part of a total or full component carrier bandwidth and generally forms or encompasses a set of contiguous common resource blocks (CRBs) within the full component carrier bandwidth. In other words, within the carrier bandwidth, a BWP starts at a CRB and may span a set of consecutive CRBs. Each BWP may be associated with its own numerology (indicating a sub-carrier spacing (SCS) and cyclic prefix (CP)). A UE 120 may be configured with up to four downlink BWPs and up to four uplink BWPs for each serving cell. To enable reasonable UE battery consumption, only one BWP in the downlink and one BWP in the uplink are generally active at a given time on an active serving cell under typical operation. The active BWP defines the operating bandwidth of the UE 120 within the operating bandwidth of the serving cell while all other BWPs with which the UE 120 is configured are deactivated. On deactivated BWPs, the UE 120 does not transmit or receive any communications.

Some network nodes 110 (for example, a base station, an RU, or a TRP) may provide communication coverage for a particular geographic area. In the 3GPP, the term "cell" can refer to a coverage area of a network node 110 or to a network node 110 itself, depending on the context in which the term is used. A network node 110 may support one or multiple (for example, three) cells. In some examples, a network node 110 may provide communication coverage for a macro cell, a pico cell, a femto cell, or another type of cell.

A macro cell may cover a relatively large geographic area (for example, several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (for example, a home) and may allow restricted access by UEs 120 having association with the femto cell (for example, UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In some examples, a cell may not necessarily be stationary. For example, the geographic area of the cell may move according to the location of an associated mobile network node 110 (for example, a train, a satellite base station, an unmanned aerial vehicle, or a non-terrestrial network (NTN) network node).

The wireless communication network 100 may be a heterogeneous network that includes network nodes 110 of different types, such as macro network nodes, pico network nodes, femto network nodes, relay network nodes, aggregated network nodes, and/or disaggregated network nodes, among other examples. In the example shown in FIG. 1, the network node 110a may be a macro network node for a macro cell 130a, the network node 110b may be a pico network node for a pico cell 130b, and the network node 110c may be a femto network node for a femto cell 130c. Various different types of network nodes 110 may generally transmit at different power levels, serve different coverage areas, and/or have different impacts on interference in the wireless communication network 100 than other types of network nodes 110. For example, macro network nodes may have a high transmit power level (for example, 5 to 40 watts), whereas pico network nodes, femto network nodes, and relay network nodes may have lower transmit power levels (for example, 0.1 to 2 watts).

The network nodes 110 and the UEs 120 of the wireless communication network 100 may communicate using the electromagnetic spectrum, which may be subdivided by frequency or wavelength into various classes, bands, carriers, and/or channels. For example, devices of the wireless communication network 100 may communicate using one or more operating bands. In some aspects, multiple wireless networks 100 may be deployed in a given geographic area. Each wireless communication network 100 may support a particular RAT (which may also be referred to as an air interface) and may operate on one or more carrier frequencies in one or more frequency ranges. Examples of RATs include a 4G RAT, a 5G/NR RAT, and/or a 6G RAT, among other examples. In some examples, when multiple RATs are deployed in a given geographic area, each RAT in the geographic area may operate on different frequencies to avoid interference with one another.

Various operating bands have been defined as frequency range designations FR1 (410 MHz through 7.125 GHZ), FR2 (24.25 GHz through 52.6 GHZ), FR3 (7.125 GHZ through 24.25 GHZ), FR4a or FR4-1 (52.6 GHz through 71 GHZ), FR4 (52.6 GHZ through 114.25 GHZ), and FR5 (114.25 GHz through 300 GHz). Although a portion of FR1 is greater than 6 GHz, FR1 is often referred to (interchangeably) as a "Sub-6 GHz" band in some documents and articles. Similarly, FR2 is often referred to (interchangeably) as a "millimeter wave" band in some documents and articles, despite being different than the extremely high frequency (EHF) band (30 GHz through 300 GHz), which is identified by the International Telecommunications Union (ITU) as a "millimeter wave" band. The frequencies between FR1 and FR2 are often referred to as mid-band frequencies, which include FR3. Frequency bands falling within FR3 may inherit FR1 characteristics or FR2 characteristics, and thus may effectively extend features of FR1 or FR2 into mid-band frequencies. Thus, "sub-6 GHZ," if used herein, may broadly refer to frequencies that are less than 6 GHZ, that are within FR1, and/or that are included in mid-band frequencies. Similarly, the term "millimeter wave," if used herein, may broadly refer to frequencies that are included in mid-band frequencies, that are within FR2, FR4, FR4-a or FR4-1, or FR5, and/or that are within the EHF band. Higher frequency bands may extend 5G NR operation, 6G operation, and/or other RATs beyond 52.6 GHZ. For example, each of FR4a, FR4-1, FR4, and FR5 falls within the EHF band. In some examples, the wireless communication network 100 may implement dynamic spectrum sharing (DSS), in which multiple RATs (for example, 4G/LTE and 5G/NR) are implemented with dynamic bandwidth allocation (for example, based on user demand) in a single frequency band. It is contemplated that the frequencies included in these operating bands (for example, FR1, FR2, FR3, FR4, FR4-a, FR4-1, and/or FR5) may be modified, and techniques described herein may be applicable to those modified frequency ranges.

In some aspects, the network node 110 may include a communication manager 150. As described in more detail elsewhere herein, the communication manager 150 may receive, from an NCR node, information that indicates an end-to-end link quality between a neighbor cell in communication with the NCR node and a UE 120 in communication with the NCR node; and transmit, to the NCR node, control information to trigger a handover of the UE 120 to the neighbor cell responsive to the information that indicates the end-to-end link quality between the neighbor cell and the UE 120. Additionally or alternatively, the communication manager 150 may receive, from an NCR node, one or more parameters related to an end-to-end link quality between a neighbor cell in communication with the NCR node and a UE 120 in communication with the NCR node; estimate the end-to-end link quality between the neighbor cell and the UE 120 in accordance with the one or more parameters; and transmit, to the NCR node, control information to trigger a handover of the UE 120 to the neighbor cell responsive to the estimated end-to-end link quality between the neighbor cell and the UE 120. Additionally or alternatively, the communication manager 150 may perform one or more other operations described herein.

Figure 2:
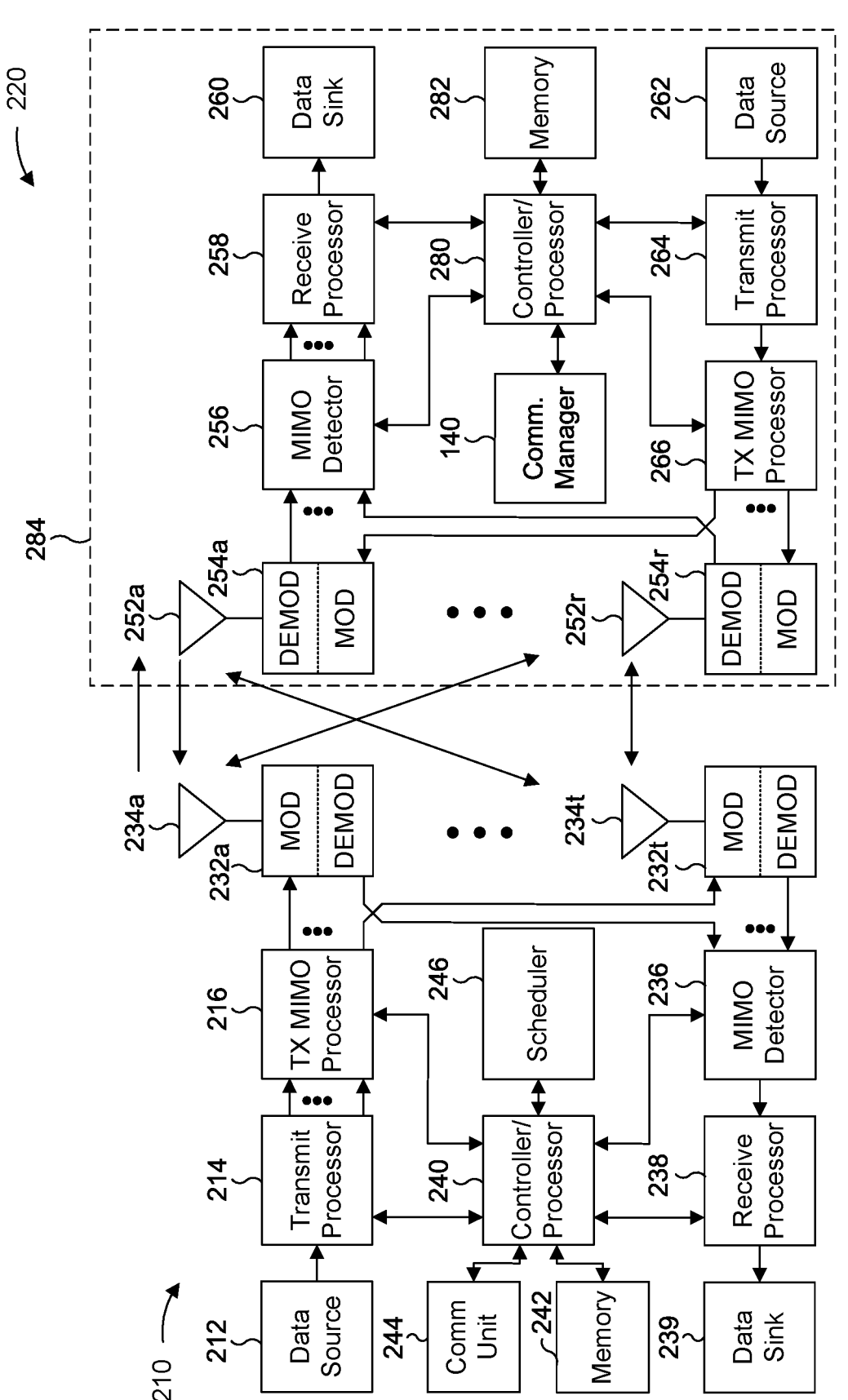
FIG. 2 is a diagram illustrating an example network node in communication with a user equipment (UE) in a wireless network in accordance with the present disclosure.

FIG. 2 is a diagram illustrating an example network node 210 in communication with an example UE 220 in a wireless network in accordance with the present disclosure. The network node 210 of FIG. 2 may be an example of the network node 110 described with reference to FIG. 1. Similarly, the UE 220 may be an example of the UE 120 described with reference to FIG. 1.

As shown in FIG. 2, the network node 210 may include a data source 212, a transmit processor 214, a transmit (TX) multiple-input multiple-output (MIMO) processor 216, a set of modems 232 (shown as 232a through 232t, where t≥1), a set of antennas 234 (shown as 234a through 234v, where v≥1), a MIMO detector 236, a receive processor 238, a data sink 239, a controller/processor 240, a memory 242, a communication unit 244, a scheduler 246, and/or a communication manager 150 among other examples. In some configurations, one or a combination of the antenna(s) 234, the modem(s) 232, the MIMO detector 236, the receive processor 238, the transmit processor 214, and/or the TX MIMO processor 216 may be included in a transceiver of the network node 210. The transceiver may be under control of and used by a processor, such as the controller/processor 240, and in some aspects in conjunction with processor-readable code stored in the memory 242, to perform aspects of the methods, processes, and/or operations described herein. In some aspects, the network node 210 may include one or more interfaces, communication components, and/or other components that facilitate communication with the UE 220 or another network node.

The terms "processor," "controller," or "controller/processor" may refer to one or more controllers and/or one or more processors. For example, reference to "a/the processor" or "a/the controller/processor" (in the singular) should be understood to refer to any one or more of the processors described in connection with FIG. 2, such as a single processor or a combination of multiple different processors. Reference to "one or more processors" should be understood to refer to any one or more of the processors described in connection with FIG. 2. For example, one or more processors of the network node 210 may include transmit processor 214, TX MIMO processor 216, MIMO detector 236, receive processor 238, and/or controller/processor 240. Similarly, one or more processors of the UE 220 may include MIMO detector 256, receive processor 258, transmit processor 264, TX MIMO processor 266, and/or controller/processor 280. As used herein, "processor," "controller," or "controller/processor" can refer to a general purpose processor, a digital signal processor (DSP), an application-specific integrated circuit (ASIC), a field programmable gate array (FPGA) or other programmable logic device (PLD), discrete gate or transistor logic, discrete hardware components, or any combination thereof. A general purpose processor may be a microprocessor or any commercially available processor, controller, microcontroller, or state machine. A processor may also be implemented as a combination of computing devices (for example, a combination of a DSP and a microprocessor, a plurality of microprocessors, one or more microprocessors in conjunction with a DSP core, a system on a chip (SoC), or any other such configuration).

In some aspects, a single processor may perform all of the operations described as being performed by the one or more processors. In some aspects, a first set of (one or more) processors of the one or more processors may perform a first function described as being performed by the one or more processors, and a second set of (one or more) processors of the one or more processors may perform a second function described as being performed by the one or more processors. The first set of processors and the second set of processors may be the same set of processors or may be different sets of processors. Reference to "one or more memories" should be understood to refer to any one or more memories of a corresponding device, such as the memory described in connection with FIG. 2. For example, functions described as being performed by one or more memories can be performed by the same subset of the one or more memories or different subsets of the one or more memories.

For downlink communication from the network node 210 to the UE 220, the transmit processor 214 may receive data ("downlink data") intended for the UE 220 (or a set of UEs that includes the UE 220) from the data source 212 (such as a data pipeline or a data queue). In some examples, the transmit processor 214 may select one or more MCSs for the UE 220 in accordance with one or more channel quality indicators (CQIs) received from the UE 220. The network node 210 may process the data (for example, including encoding the data) for transmission to the UE 220 on a downlink in accordance with the MCS(s) selected for the UE 220 to generate data symbols. The transmit processor 214 may process system information (for example, semi-static resource partitioning information (SRPI)) and/or control information (for example, CQI requests, grants, and/or upper layer signaling) and provide overhead symbols and/or control symbols. The transmit processor 214 may generate reference symbols for reference signals (for example, a cell-specific reference signal (CRS), a demodulation reference signal (DMRS), or a channel state information (CSI) reference signal (CSI-RS)) and/or synchronization signals (for example, a primary synchronization signal (PSS) or a secondary synchronization signals (SSS)).

The TX MIMO processor 216 may perform spatial processing (for example, precoding) on the data symbols, the control symbols, the overhead symbols, and/or the reference symbols, if applicable, and may provide a set of output symbol streams (for example, T output symbol streams) to the set of modems 232. For example, each output symbol stream may be provided to a respective modulator component (shown as MOD) of a modem 232. Each modem 232 may use the respective modulator component to process (for example, to modulate) a respective output symbol stream (for example, for orthogonal frequency division multiplexing ((OFDM)) to obtain an output sample stream. Each modem 232 may further use the respective modulator component to process (for example, convert to analog, amplify, filter, and/or upconvert) the output sample stream to obtain a time domain downlink signal. The modems 232a through 232t may together transmit a set of downlink signals (for example, T downlink signals) via the corresponding set of antennas 234.

A downlink signal may include a DCI communication, a MAC control element (MAC-CE) communication, an RRC communication, a downlink reference signal, or another type of downlink communication. Downlink signals may be transmitted on a PDCCH, a PDSCH, and/or on another downlink channel. A downlink signal may carry one or more transport blocks (TBs) of data. A TB may be a unit of data that is transmitted over an air interface in the wireless communication network 100. A data stream (for example, from the data source 212) may be encoded into multiple TBs for transmission over the air interface. The quantity of TBs used to carry the data associated with a particular data stream may be associated with a TB size common to the multiple TBs. The TB size may be based on or otherwise associated with radio channel conditions of the air interface, the MCS used for encoding the data, the downlink resources allocated for transmitting the data, and/or another parameter. In general, the larger the TB size, the greater the amount of data that can be transmitted in a single transmission, which reduces signaling overhead. However, larger TB sizes may be more prone to transmission and/or reception errors than smaller TB sizes, but such errors may be mitigated by more robust error correction techniques.

For uplink communication from the UE 220 to the network node 210, uplink signals from the UE 220 may be received by an antenna 234, may be processed by a modem 232 (for example, a demodulator component, shown as DEMOD, of a modem 232), may be detected by the MIMO detector 236 (for example, a receive (Rx) MIMO processor) if applicable, and/or may be further processed by the receive processor 238 to obtain decoded data and/or control information. The receive processor 238 may provide the decoded data to a data sink 239 (which may be a data pipeline, a data queue, and/or another type of data sink) and provide the decoded control information to a processor, such as the controller/processor 240.

The network node 210 may use the scheduler 246 to schedule one or more UEs 220 for downlink or uplink communications. In some aspects, the scheduler 246 may use DCI to dynamically schedule DL transmissions to the UE 220 and/or UL transmissions from the UE 220. In some examples, the scheduler 246 may allocate recurring time domain resources and/or frequency domain resources that the UE 220 may use to transmit and/or receive communications using an RRC configuration (for example, a semi-static configuration), for example, to perform semi-persistent scheduling (SPS) or to configure a configured grant (CG) for the UE 220.

One or more of the transmit processor 214, the TX MIMO processor 216, the modem 232, the antenna 234, the MIMO detector 236, the receive processor 238, and/or the controller/processor 240 may be included in an RF chain of the network node 210. An RF chain may include filters, mixers, oscillators, amplifiers, analog-to-digital converters (ADCs), and/or other devices that convert between an analog signal (such as for transmission or reception via an air interface) and a digital signal (such as for processing by one or more processors of the network node 210). In some aspects, the RF chain may be or may be included in a transceiver of the network node 210.

In some examples, the network node 210 may use the communication unit 244 to communicate with a core network and/or with other network nodes. The communication unit 244 may support wired and/or wireless communication protocols and/or connections, such as Ethernet, optical fiber, common public radio interface (CPRI), and/or a wired or wireless backhaul, among other examples. The network node 210 may use the communication unit 244 to transmit and/or receive data associated with the UE 220 or to perform network control signaling, among other examples. The communication unit 244 may include a transceiver and/or an interface, such as a network interface.

The UE 220 may include a set of antennas 252 (shown as antennas 252a through 252r, where r≥1), a set of modems 254 (shown as modems 254a through 254u, where u≥1), a MIMO detector 256, a receive processor 258, a data sink 260, a data source 262, a transmit processor 264, a TX MIMO processor 266, a controller/processor 280, and/or a memory 282, among other examples. One or more of the components of the UE 220 may be included in a housing 284. In some aspects, one or a combination of the antenna(s) 252, the modem(s) 254, the MIMO detector 256, the receive processor 258, the transmit processor 264, or the TX MIMO processor 266 may be included in a transceiver that is included in the UE 220. The transceiver may be under control of and used by a processor, such as the controller/processor 280, and in some aspects in conjunction with processor-readable code stored in the memory 282, to perform aspects of the methods, processes, or operations described herein. In some aspects, the UE 220 may include another interface, another communication component, and/or another component that facilitates communication with the network node 210 and/or another UE 220.

For downlink communication from the network node 210 to the UE 220, the set of antennas 252 may receive the downlink communications or signals from the network node 210 and may provide a set of received downlink signals (for example, R received signals) to the set of modems 254 (for example, each received signal may be provided to a respective demodulator component (shown as DEMOD) of a modem 254. Each modem 254 may use the respective demodulator component to condition (for example, filter, amplify, downconvert, and/or digitize) a received signal to obtain input samples. Each modem 254 may use the respective demodulator component to further demodulate or process the input samples (for example, for OFDM) to obtain received symbols. The MIMO detector 256 may obtain received symbols from the set of modems 254, may perform MIMO detection on the received symbols if applicable, and may provide detected symbols. The receive processor 258 may process (for example, decode) the detected symbols, may provide decoded data for the UE 220 to the data sink 260 (such as a data pipeline, a data queue, and/or an application executed on the UE 220), and may provide decoded control information and system information to the controller/processor 280.

For uplink communication from the UE 220 to the network node 210, the transmit processor 264 may receive and process data ("uplink data") from a data source 262 (such as a data pipeline, a data queue, and/or an application executed on the UE 220) and control information from the controller/processor 280. The control information may include one or more parameters, feedback, one or more signal measurements, and/or other types of control information. In some aspects, the receive processor 258 and/or the controller/processor 280 may determine, for a received signal (such as received from the network node 210 or another UE), one or more parameters relating to transmission of the uplink communication. The one or more parameters may include a reference signal received power (RSRP) parameter, a received signal strength indicator (RSSI) parameter, a reference signal received quality (RSRQ) parameter, a CQI parameter, or a transmit power control (TPC) parameter, among other examples. The control information may include an indication of the RSRP parameter, the RSSI parameter, the RSRQ parameter, the CQI parameter, the TPC parameter, and/or another parameter. The control information may facilitate parameter selection and/or scheduling for the UE 220 by the network node 210.

The transmit processor 264 may generate reference symbols for one or more reference signals, such as an uplink DMRS, an uplink sounding reference signal (SRS), and/or another type of reference signal. The symbols from the transmit processor 264 may be precoded by the TX MIMO processor 266, if applicable, and further processed by the set of modems 254 (for example, for DFT-s-OFDM or CP-OFDM). The TX MIMO processor 266 may perform spatial processing (for example, precoding) on the data symbols, the control symbols, the overhead symbols, and/or the reference symbols, if applicable, and may provide a set of output symbol streams (for example, R output symbol streams) to the set of modems 254. For example, each output symbol stream may be provided to a respective modulator component (shown as MOD) of a modem 254. Each modem 254 may use the respective modulator component to process (for example, to modulate) a respective output symbol stream (for example, for OFDM) to obtain an output sample stream. Each modem 254 may further use the respective modulator component to process (for example, convert to analog, amplify, filter, and/or upconvert) the output sample stream to obtain an uplink signal.

The modems 254a through 254r may transmit a set of uplink signals (for example, R uplink signals) via the corresponding set of antennas 252. An uplink signal may include an uplink control information (UCI) communication, a MAC-CE communication, an RRC communication, or another type of uplink communication. Uplink signals may be transmitted on a PUSCH, a PUCCH, and/or another type of uplink channel. An uplink signal may carry one or more TBs of data. Sidelink data and control transmissions (that is, transmissions directly between two or more UEs 220) may generally use similar techniques as were described for uplink data and control transmission, and may use sidelink-specific channels such as a physical sidelink shared channel (PSSCH), a physical sidelink control channel (PSCCH), and/or a physical sidelink feedback channel (PSFCH).

One or more antennas of the set of antennas 252 or the set of antennas 234 may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled with one or more transmission or reception components, such as one or more components of FIG. 2. As used herein, "antenna" can refer to one or more antennas, one or more antenna panels, one or more antenna groups, one or more sets of antenna elements, or one or more antenna arrays. "Antenna panel" can refer to a group of antennas (such as antenna elements) arranged in an array or panel, which may facilitate beamforming by manipulating parameters of the group of antennas. "Antenna module" may refer to circuitry including one or more antennas, which may also include one or more other components (such as filters, amplifiers, or processors) associated with integrating the antenna module into a wireless communication device.

In some examples, each of the antenna elements of an antenna 234 or an antenna 252 may include one or more sub-elements for radiating or receiving radio frequency signals. For example, a single antenna element may include a first sub-element cross-polarized with a second sub-element that can be used to independently transmit cross-polarized signals. The antenna elements may include patch antennas, dipole antennas, and/or other types of antennas arranged in a linear pattern, a two-dimensional pattern, or another pattern. A spacing between antenna elements may be such that signals with a desired wavelength transmitted separately by the antenna elements may interact or interfere constructively and destructively along various directions (such as to form a desired beam). For example, given an expected range of wavelengths or frequencies, the spacing may provide a quarter wavelength, a half wavelength, or another fraction of a wavelength of spacing between neighboring antenna elements to allow for the desired constructive and destructive interference patterns of signals transmitted by the separate antenna elements within that expected range.

The amplitudes and/or phases of signals transmitted via antenna elements and/or sub-elements may be modulated and shifted relative to each other (such as by manipulating phase shift, phase offset, and/or amplitude) to generate one or more beams, which is referred to as beamforming. The term "beam" may refer to a directional transmission of a wireless signal toward a receiving device or otherwise in a desired direction. The term "beam" may also generally refer to a direction associated with such a directional signal transmission, a set of directional resources associated with the signal transmission (for example, an angle of arrival, a horizontal direction, and/or a vertical direction), and/or a set of parameters that indicate one or more aspects of a directional signal, a direction associated with the signal, and/or a set of directional resources associated with the signal. In some implementations, antenna elements may be individually selected or deselected for directional transmission of a signal (or signals) by controlling amplitudes of one or more corresponding amplifiers and/or phases of the signal(s) to form one or more beams. The shape of a beam (such as the amplitude, width, and/or presence of side lobes) and/or the direction of a beam (such as an angle of the beam relative to a surface of an antenna array) can be dynamically controlled by modifying the phase shifts, phase offsets, and/or amplitudes of the multiple signals relative to each other.

Different UEs 220 or network nodes 110 may include different numbers of antenna elements. For example, a UE 220 may include a single antenna element, two antenna elements, four antenna elements, eight antenna elements, or a different number of antenna elements. As another example, a network node 210 may include eight antenna elements, 24 antenna elements, 64 antenna elements, 128 antenna elements, or a different number of antenna elements. Generally, a larger number of antenna elements may provide increased control over parameters for beam generation relative to a smaller number of antenna elements, whereas a smaller number of antenna elements may be less complex to implement and may use less power than a larger number of antenna elements. Multiple antenna elements may support multiple-layer transmission, in which a first layer of a communication (which may include a first data stream) and a second layer of a communication (which may include a second data stream) are transmitted using the same time and frequency resources with spatial multiplexing.

The network node 210 may provide the UE 220 with a configuration of transmission configuration indicator (TCI) states that indicate or correspond to beams that may be used by the UE 220, such as for receiving one or more communications via a physical channel. For example, the network node 210 may indicate (for example, using DCI) an activated TCI state to the UE 220, which the UE 220 may use to generate a beam for receiving one or more communications via the physical channel. A beam indication may be, or may include, a TCI state information element, a beam identifier (ID), spatial relation information, a TCI state ID, a closed loop index, a panel ID, a TRP ID, and/or an SRS set ID, among other examples. A TCI state information element (sometimes referred to as a TCI state herein) may indicate particular information associated with a beam. For example, the TCI state information element may indicate a TCI state identification (for example, a tci-StateID), a quasi-co-location (QCL) type (for example, a qcl-Type1, qcl-Type2, qcl-TypeA, qcl-TypeB, qcl-TypeC, or a qcl-TypeD, among other examples), a cell identification (for example, a Serv-CellIndex), a bandwidth part identification (bwp-Id), or a reference signal identification, such as a CSI-RS identification (for example, an NZP-CSI-RS-ResourceId or an SSB-Index, among other examples). Spatial relation information may similarly indicate information associated with an uplink beam. The beam indication may be a joint or separate DL/UL beam indication in a unified TCI framework. In a unified TCI framework, the network may support common TCI state ID update and activation, which may provide common QCL and/or common UL transmission spatial filters across a set of configured component carriers. This type of beam indication may apply to intra-band CA, as well as to joint DL/UL and separate DL/UL beam indications. The common TCI state ID may imply that one reference signal determined according to the TCI state(s) indicated by a common TCI state ID is used to provide QCL Type-D indication and to determine UL transmission spatial filters across the set of configured CCs.

In some examples, the network may support a layer 1 (L1)-based beam indication using at least UE-specific (unicast) DCI to indicate joint or separate DL/UL beam indications that may be selected from active TCI states. In some examples, DCI formats 1_1 and/or 1_2 may be used for beam indication. The network node 210 may include a support mechanism for the UE 220 to acknowledge successful decoding of a beam indication. For example, the acknowledgment/negative acknowledgment of the PDSCH scheduled by the DCI carrying the beam indication may also be used as an acknowledgement for the DCI.

Further efficiencies in throughput, signal strength, and/or other signal properties may be achieved through beam refinement. For example, the network node 210 may be capable of communicating with the UE 220 using beams of various beam widths. For example, the network node 210 may be configured to utilize a wider beam to communicate with the UE 220 when the UE 220 is in motion because wider coverage may increase the likelihood that the UE 220 remains in coverage of the network node 210 while moving. Conversely, the network node 220 may use a narrower beam to communicate with the UE 220 when the UE 220 is stationary because the network node 210 can reliably focus coverage on the UE 220 with low or minimal likelihood of the UE 220 moving out of the coverage area of the network node 210. In some examples, to select a particular beam for communication with a UE 220, the network node 210 may transmit a reference signal, such as a synchronization signal block (SSB) or a CSI-RS, on each of a plurality of beams in a beam-sweeping manner. In some examples, SSBs may be transmitted on wider beams, whereas CSI-RSs may be transmitted on narrower beams. The UE 220 may measure the RSRP or the signal-to-interference-plus-noise ratio (SINR) on each of the beams and transmit a beam measurement report (for example, an L1 measurement report) to the network node 210 indicating the RSRP or SINR associated with each of one or more of the measured beams. The network node 210 may then select the particular beam for communication with the UE 220 based on the L1 measurement report. In some other examples, when there is channel reciprocity between the uplink and the downlink, the network node 210 may derive the particular beam to communicate with the UE 220 (for example, on both the uplink and downlink) based on uplink measurements of one or more uplink reference signals, such as an SRS, transmitted by the UE 220.

One enhancement for multi-beam operation at higher carrier frequencies is facilitation of efficient (for example, low latency and low overhead) downlink and/or uplink beam management operations to support higher Layer 1 and/or Layer 2 (L1/L2)-centric inter-cell mobility. L1 and/or L2 signaling may be referred to as "lower layer" signaling and may be used to activate and/or deactivate candidate cells in a set of cells configured for L1/L2 mobility and/or to provide reference signals for measurement by the UE 220, by which the UE 220 may select a candidate beam as a target beam for a lower layer handover operation. Accordingly, one goal for L1/L2-centric inter-cell mobility is to enable a UE to perform a cell switch via dynamic control signaling at lower layers (for example, DCI for L1 signaling or a MAC-CE for L2 signaling), rather than semi-static Layer 3 (L3) RRC signaling, in order to reduce latency, reduce overhead, and/or otherwise increase efficiency of the cell switch.

In some examples, for a UE 220, UL transmission may be performed using one antenna panel, and DL reception may be performed using another antenna panel. In some examples, full-duplex communication may be conditional on a beam separation of the UL beam and DL beam at respective antenna panels. Utilizing full-duplex communication may provide a reduction in latency, such that it may be possible to receive a DL signal in UL-only slots, which may enable latency savings. In addition, full-duplex communication may enhance spectrum efficiency per cell or per UE 220, and may enable more efficient utilization of resources. Beam separation of the UL and DL beams assists in limiting or reducing self-interference that may occur during full duplex communication. UL and DL beams that are separated on their respective antenna panels may provide reliable full duplex communication by minimizing or reducing self-interference.

A full-duplex UE 220 may perform a self-interference measurement (SIM) procedure to identify self-interference from transmissions of the full-duplex UE 220. A full-duplex network node 210 also may perform a SIM procedure to identify self-interference from transmissions of the full-duplex network node 210. The UE 220 may provide a measurement report to the network node 210 to indicate results of the UE SIM. The network node 210 may select pairs of beams (referred to herein as "beam pairs") for the UE 220 ("UE beam pairs") and the network node 210 ("network node beam pairs") to use during full-duplex communications. A beam pair generally includes a receive (Rx) beam and a transmit (Tx) beam, such as a DL beam and an UL beam, respectively, for the UE 220, and similarly, an UL beam and a DL beam, respectively, for the network node 210.

Figure 3:
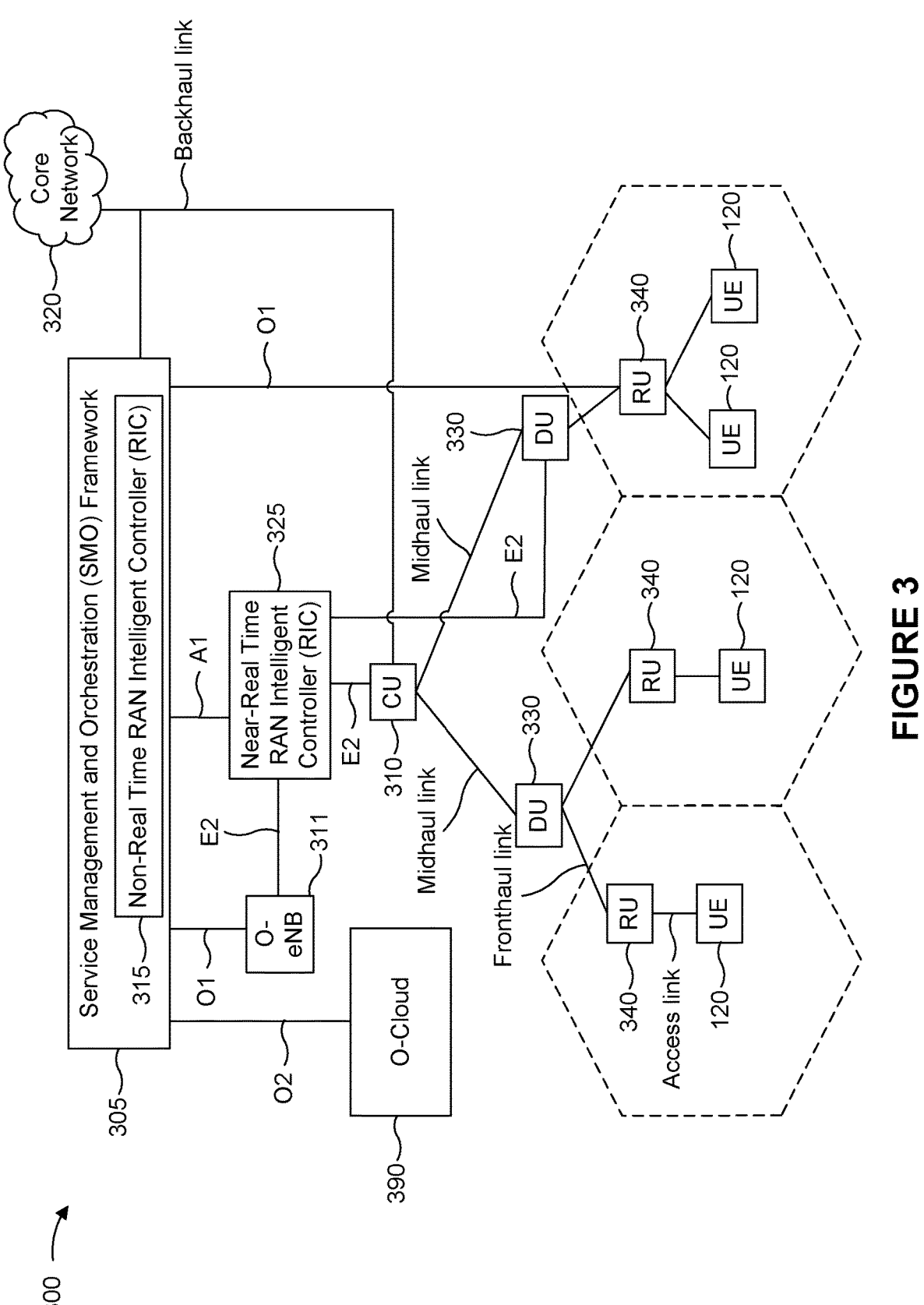
FIG. 3 is a diagram illustrating an example disaggregated base station architecture in accordance with the present disclosure.

FIG. 3 is a diagram illustrating an example disaggregated base station architecture 300 in accordance with the present disclosure. One or more components of the example disaggregated base station architecture 300 may be, may include, or may be included in one or more network nodes (such one or more network nodes 110 or one or more network nodes 210). The disaggregated base station architecture 300 may include a CU 310 that can communicate directly with a core network 320 via a backhaul link, or that can communicate indirectly with the core network 320 via one or more disaggregated control units, such as a Near-RT RIC 325 (for example, via an E2 link) and/or a Non-RT RIC 315 associated with a Service Management and Orchestration (SMO) Framework 305. The CU 310 may communicate with one or more DUs 330 via respective midhaul links, such as via F1 interfaces. Each of the DUs 330 may communicate with one or more RUs 340 via respective fronthaul links. Each of the RUs 340 may communicate with one or more UEs 120 via respective RF access links. In some deployments, a UE 120 may be simultaneously served by multiple RUs 340.

Each of the components of the disaggregated base station architecture 300, including the CUS 310, the DUs 330, the RUs 340, the Near-RT RICs 325, the Non-RT RICs 315, and the SMO Framework 305, may include one or more interfaces or may be coupled with one or more interfaces for receiving or transmitting signals, such as data or information, via a wired or wireless transmission medium.

In some aspects, the CU 310 may be logically split into one or more CU-UP units and one or more CU-CP units. A CU-UP unit may communicate bidirectionally with a CU-CP unit via an interface, such as the E1 interface when implemented in an O-RAN configuration. The CU 310 may be deployed to communicate with one or more DUs 330, as necessary, for network control and signaling. Each DU 330 may correspond to a logical unit that includes one or more base station functions to control the operation of one or more RUs 340. For example, a DU 330 may host various layers, such as an RLC layer, a MAC layer, or one or more PHY layers, such as one or more high PHY layers or one or more low PHY layers. Each layer (which also may be referred to as a module) may be implemented with an interface for communicating signals with other layers (and modules) hosted by the DU 330, or for communicating signals with the control functions hosted by the CU 310. Each RU 340 may implement lower layer functionality. In some aspects, real-time and non-real-time aspects of control and user plane communication with the RU(s) 340 may be controlled by the corresponding DU 330.

The SMO Framework 305 may support RAN deployment and provisioning of non-virtualized and virtualized network elements. For non-virtualized network elements, the SMO Framework 305 may support the deployment of dedicated physical resources for RAN coverage requirements, which may be managed via an operations and maintenance interface, such as an O1 interface. For virtualized network elements, the SMO Framework 305 may interact with a cloud computing platform (such as an open cloud (O-Cloud) platform 390) to perform network element life cycle management (such as to instantiate virtualized network elements) via a cloud computing platform interface, such as an O2 interface. A virtualized network element may include, but is not limited to, a CU 310, a DU 330, an RU 340, a non-RT RIC 315, and/or a Near-RT RIC 325. In some aspects, the SMO Framework 305 may communicate with a hardware aspect of a 4G RAN, a 5G NR RAN, and/or a 6G RAN, such as an open eNB (O-CNB) 311, via an O1 interface. Additionally or alternatively, the SMO Framework 305 may communicate directly with each of one or more RUs 340 via a respective O1 interface. In some deployments, this configuration can enable each DU 330 and the CU 310 to be implemented in a cloud-based RAN architecture, such as a vRAN architecture.

The Non-RT RIC 315 may include or may implement a logical function that enables non-real-time control and optimization of RAN elements and resources, artificial intelligence and/or machine learning (AI/ML) workflows including model training and updates, and/or policy-based guidance of applications and/or features in the Near-RT RIC 325. The Non-RT RIC 315 may be coupled to or may communicate with (such as via an AI interface) the Near-RT RIC 325. The Near-RT RIC 325 may include or may implement a logical function that enables near-real-time control and optimization of RAN elements and resources via data collection and actions via an interface (such as via an E2 interface) connecting one or more CUs 310, one or more DUs 330, and/or an O-eNB with the Near-RT RIC 325.

In some aspects, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may tune RAN behavior or performance. For example, the Non-RT RIC 315 may monitor long-term trends and patterns for performance and may employ AI/ML models to perform corrective actions via the SMO Framework 305 (such as reconfiguration via an O1 interface) or via creation of RAN management policies (such as AI interface policies).

The network node 110, the controller/processor 240 of the network node 210, the UE 120, the controller/processor 280 of the UE 220, the CU 310, the DU 330, the RU 340, or any other component(s) of FIG. 1, 2, or 3 may implement one or more techniques or perform one or more operations associated with a repeater handover decision based on end-to-end link quality, as described in more detail elsewhere herein. For example, the controller/processor 240 of the network node 210, the controller/processor 280 of the UE 220, any other component(s) of FIG. 2, the CU 310, the DU 330, or the RU 340 may perform or direct operations of, for example, process 1100 of FIG. 11, process 1200 of FIG. 12, or other processes as described herein (alone or in conjunction with one or more other processors). The memory 242 may store data and program codes for the network node 110, the network node 210, the CU 310, the DU 330, or the RU 340. The memory 282 may store data and program codes for the UE 120 or the UE 220. In some examples, the memory 242 or the memory 282 may include a non-transitory computer-readable medium storing a set of instructions (for example, code or program code) for wireless communication. The memory 242 may include one or more memories, such as a single memory or multiple different memories (of the same type or of different types). The memory 282 may include one or more memories, such as a single memory or multiple different memories (of the same type or of different types). For example, the set of instructions, when executed (for example, directly, or after compiling, converting, or interpreting) by one or more processors of the network node 210, the UE 220, the CU 310, the DU 330, or the RU 340, may cause the one or more processors to perform process 1100 of FIG. 11, process 1200 of FIG. 12, or other processes as described herein. In some examples, executing instructions may include running the instructions, converting the instructions, compiling the instructions, and/or interpreting the instructions, among other examples.

In some aspects, the network node 110 includes means for receiving, from an NCR node, information that indicates an end-to-end link quality between a neighbor cell in communication with the NCR node and a UE 120 in communication with the NCR node; and/or means for transmitting, to the NCR node, control information to trigger a handover of the UE 120 to the neighbor cell responsive to the information that indicates the end-to-end link quality between the neighbor cell and the UE 120. In some aspects, the means for the network node 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, the network node 110 includes means for receiving, from an NCR node, one or more parameters related to an end-to-end link quality between a neighbor cell in communication with the NCR node and a UE 120 in communication with the NCR node; means for estimating the end-to-end link quality between the neighbor cell and the UE in accordance with the one or more parameters; and/or means for transmitting, to the NCR node, control information to trigger a handover of the UE 120 to the neighbor cell responsive to the estimated end-to-end link quality between the neighbor cell and the UE. In some aspects, the means for the network node 110 to perform operations described herein may include, for example, the communication manager 150, the transmit processor 220, the TX MIMO processor 230, the modem 232, the antenna 234, the MIMO detector 236, the receive processor 238, the controller/processor 240, the memory 242, and/or the scheduler 246.

Figure 4:
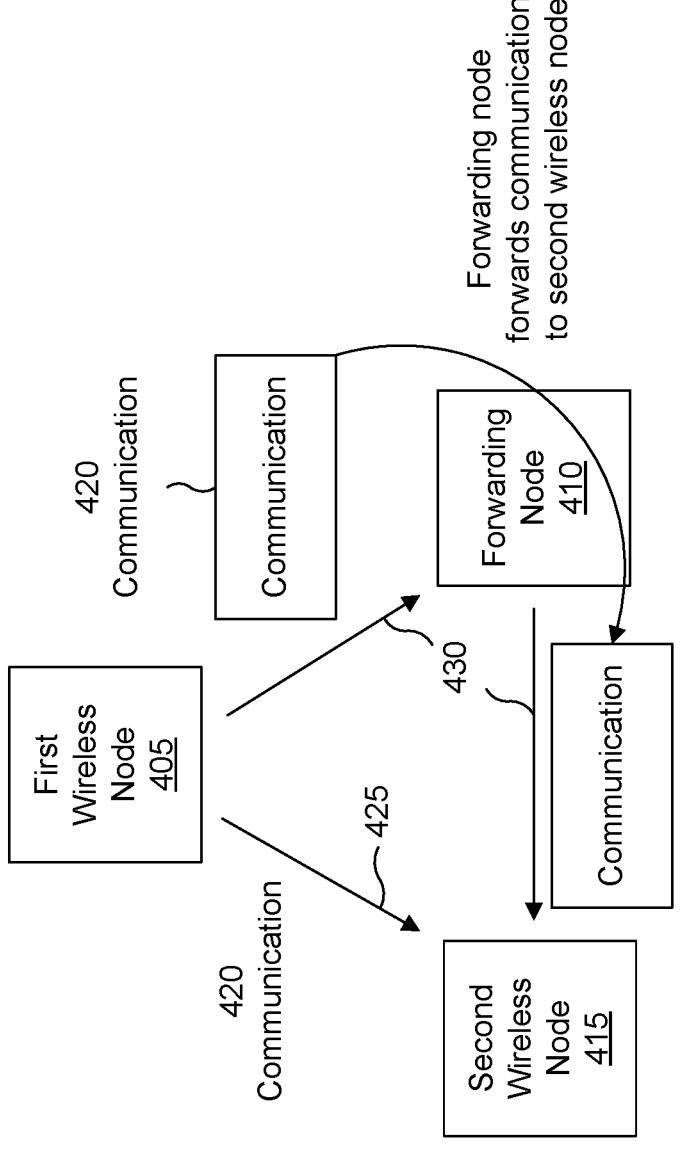
FIG. 4 is a diagram illustrating an example of a forwarding node that forwards communications between a first wireless node and a second wireless node in accordance with the present disclosure.

FIG. 4 is a diagram illustrating an example 400 of a forwarding node (for example, a repeater node or a relay node) that forwards communications between a first wireless node and a second wireless node in accordance with the present disclosure. As shown, example 400 includes a first wireless node 405 (for example, an IAB node, an IAB donor, a network node 110, and/or a UE 120), a forwarding node 410 (for example, a repeater device, a relay device, a network node 110, a UE 120, an mmWave repeater, a mmWave relay, a digital repeater, an analog repeater, a digital relay, and/or an analog relay), and a second wireless node 415 (for example, an IAB node, an IAB donor, a network node 110, a UE 120, and/or another forwarding node 410). In some aspects, the first wireless node 405 and/or the second wireless node 415 may be aware of the forwarding node 410. In some aspects, the first wireless node 405 and/or the second wireless node 415 may be unaware of the forwarding node 410 (for example, the forwarding node 410 may be transparent to the first wireless node 405 and/or the second wireless node 415).

As shown in FIG. 4, the first wireless node 405 may have a communication 420 (for example, a data communication, and/or a control communication) to transmit to the second wireless node 415 using a direct link 425 (for example, an access link) between the first wireless node 405 and the second wireless node 415. However, the first wireless node 405 may be unable to transmit the communication 420 to the second wireless node 415 using the direct link 425. For example, the second wireless node 415 may be outside of a transmit range of the first wireless node 405 or the direct link 425 may be blocked, among other examples.

Therefore, in some examples, the first wireless node 405 may communicate with the second wireless node 415 using an indirect link 430. For example, the first wireless node 405 may transmit the communication 420 to the forwarding node 410. In some aspects, the first wireless node 405 may transmit the communication 420 directly to the forwarding node 410 (for example, in a case where the first wireless node 405 is aware of the forwarding node 410). In some aspects, the forwarding node 410 may be configured (for example, by a control node and/or by the second wireless node 415) to receive the communication 420 from the first wireless node 405 (for example, in a case where the first wireless node 405 is unaware of the forwarding node 410).

As shown in FIG. 4, the communication 420 may arrive at the forwarding node 410 and may be forwarded to the second wireless node 415 by the forwarding node 410. In some aspects, the forwarding node 410 is a repeater node (or repeater unit), and the repeater node may regenerate a signal of the communication 420. For example, the repeater node may receive a signal of the communication 420, extract tones from the signal, regenerate the signal based at least in part on the extracted tones, and transmit the regenerated signal. In some aspects, the forwarding node 410 is a relay node (or relay unit), and the relay node may generate a new signal based at least in part on a signal of the communication 420. For example, the relay node may receive a downlink signal that carries information associated with a communication (for example, in-phase and quadrature (IQ) samples), generate a new signal based at least in part on the information, and transmit the new signal. As another example, the relay node may receive an uplink signal, generate a new signal that carries information associated with the uplink signal (for example, IQ samples), and transmit the new signal.

In some cases, the indirect link 430 may be an access link, a sidelink, a control link, a backhaul link, or a fronthaul link. For example, if the first wireless node 405 is a network node 110 and the second wireless node 415 is a UE 120, the indirect link 430 between the first wireless node 405 and the forwarding node 410 may be a control link, a backhaul link, or a fronthaul link. The indirect link 430 between the forwarding node 410 and the second wireless node 415 may be an access link. Using the communication scheme shown in FIG. 4 may improve network performance and increase reliability by providing the first wireless node 405 and/or the second wireless node 415 with link diversity for communications, by extending a communication coverage area of the first wireless node 405 and/or the second wireless node 415.

Figure 5:
FIG. 5 is a diagram illustrating an example of forwarding a wireless signal using a forwarding node, in accordance with the present disclosure.

FIG. 5 is a diagram illustrating an example 500 of forwarding a wireless signal using a forwarding node 505, in accordance with the present disclosure. In some aspects, as shown, the forwarding node 505 may communicate with a control node 510 and one or more wireless nodes 515, 520 in a wireless network. In some aspects, the forwarding node 505 may include the forwarding node 410 shown in FIG. 4. In some aspects, the control node 510, the wireless node 515, and/or the wireless node 520 may be a wireless node such as, for example, the first wireless node 405 shown in FIG. 4, the second wireless node 415 shown in FIG. 4, an IAB node, an IAB donor, a network node 110 shown in FIG. 1, and/or a UE 120 shown in FIG. 1, among other examples.

In some aspects, the forwarding node 505 may be a digital repeater node (or repeater unit) configured to receive an incoming signal and to transmit a regenerated version of the incoming signal. For example, when implemented or otherwise configured as a digital repeater node, the forwarding node 505 may receive an incoming signal, extract tones from the incoming signal, regenerate the incoming signal based at least in part on the extracted tones, and transmit the regenerated signal as an outgoing signal. Additionally or alternatively, the forwarding node 505 may be a digital relay node (or relay unit) configured to generate a new signal based at least in part on an incoming signal. For example, when implemented or otherwise configured as a digital relay node, the forwarding node 505 may receive a downlink signal (for example, a fronthaul PDSCH (FH-PDSCH)) that carries information (for example, IQ samples), generate a new downlink signal (for example, a legacy PDSCH) that carries information about and/or from the downlink signal (for example, the IQ samples), and transmit the new downlink signal to a receiver. As another example, when implemented or otherwise configured as a digital relay node, the forwarding node 505 may receive an uplink signal (for example, a legacy PUSCH), generate a new uplink signal (for example, an FH-PUSCH) that carries information associated with the uplink signal (for example, IQ samples), and transmit the new uplink signal to a receiver.

As shown in FIG. 5, the forwarding node 505 may include a control component 525 and a forwarding component 530. In some aspects, the control component 525 may facilitate establishing a wireless control interface 535 between the forwarding node 505 and the control node 510. In some aspects, the control component 525 may include one or more components and/or functions that are, or are similar to, one or more components of a network node (for example, the network node 110 shown in FIGS. 1-3) and/or a UE (for example, the UE 120 shown in FIGS. 1-3). In some aspects, the forwarding component 530 may perform one or more forwarding (for example, repeating and/or relaying) operations based at least in part on information received by the control component over the wireless control interface 535. For example, a forwarding operation may include receiving a first signal 540, performing one or more digital processing operations on the first signal 540 to generate a second signal 545, and transmitting the second signal 545. The second signal 545 may be the result of the forwarding node 505 performing a repeating operation to regenerate the first signal 540 (for example, through the one or more digital processing operations) such that X'≈X, where X is the first signal 540 and X' is the second signal 545. Additionally or alternatively, the second signal 545 may be the result of the forwarding node 505 performing a relaying operation to generate a new signal that carries information about and/or from the first signal 540 (for example, through the one or more digital processing operations) such that Y=f(X), where X is the first signal 540, Y is the second signal 545, and f is a function based at least in part on one or more digital processing operations that the forwarding node 505 performs to generate the new signal.

In some aspects, the first signal 540 may include a communication (for example, the communication 420 shown in FIG. 4) that is transmitted from the control node 510 and addressed to the wireless node 515. In some aspects, as shown, the first signal 540 may be transmitted from the control node 510 and addressed to the wireless node 515. In some aspects, the first signal 540 may be transmitted from the wireless node 515 or the wireless node 520 and addressed to the control node 510, the other wireless node 515, or the wireless node 520. In some aspects, the first signal 540 may be addressed to a plurality of wireless nodes (for example, wireless node 515, wireless node 520, and/or control node 510). In some aspects, the first signal 540 may include an SSB and/or a remaining minimum system information (RMSI) communication, information associated with an SSB or a RMSI communication, a PDCCH transmission, a PDSCH transmission, a PUCCH transmission, a PUSCH transmission, a PSCCH transmission, a PSSCH transmission, and/or an acknowledgement or negative acknowledgement (ACK/NACK) feedback message.

In some aspects, the forwarding component 530 may perform the one or more forwarding operations in accordance with a configuration established using the control component 525. For example, in some aspects, the control node 510 may transmit configuration information 550 using a control message 555, and the forwarding node 505 may receive the control message 555 using the control component 525.

In some aspects, the control node 510 may transmit the configuration information 550 in the control message 555 via the wireless control interface 535. The configuration information 550 may be carried in at least one control message 555. In some aspects, control messages may be used to control communication between the forwarding node 505 and the control node 510 in accordance with a specification of the wireless control interface 535. In some aspects, the configuration information 550 may be carried in a lower-layer control message (for example, a control message associated with physical layers and/or MAC layers), an upper-layer control message (for example, a control message associated with network layers), and/or an application-layer control message (for example, a control message associated with an application layer) like. For example, a control message may be carried using an RRC message, DCI, and/or a MAC-CE.

In some aspects, a control message may be included within the first signal 540. In some aspects, the configuration information 550 may be carried in a fronthaul PDCCH (FH-PDCCH) control message. In some aspects, the FH-PDCCH control message may include DCI scrambled by a fronthaul radio network temporary identifier (FH-RNTI). The FH-RNTI may be associated with the control component 525.

In some aspects, the control message 555 may configure one or more types of settings, configurations, digital processing operations, receiving operations, buffering operations, and/or forwarding (transmitting) operations. In some aspects, the forwarding node 505 may transmit, and the control node 510 may receive, one or more control messages. For example, in some aspects, the forwarding node 505 may, using the control component 525, transmit a control message via the wireless control interface 535 to the control node 510. The control message transmitted by the forwarding node 505 may indicate a configuration, a capability, a status, and/or other information related to the forwarding node 505.

As described herein, in some aspects, the control node 510 may configure the forwarding node 505 for a particular forwarding (for example, repeating and/or relaying) operation by transmitting configuration information 550 to the forwarding node 505. In some aspects, the configuration information 550 may indicate a digital processing operation. The digital processing operation may include a digital processing option selected from a plurality of digital processing options. In some aspects, the configuration information 550 may include one or more information elements (IEs) that indicate a reception configuration, a buffering configuration, a forwarding configuration, and/or an information request.

In some aspects, the reception configuration may configure one or more receiving operations of the forwarding component 530 with respect to receiving the first signal 540. The reception configuration may indicate, for example, a receiving analog beamforming configuration, a time domain resource associated with the first signal 540, a frequency domain resource associated with the first signal 540, a numerology associated with the first signal 540, a digital receiver beamforming configuration, resource element (RE) mapping information associated with the first signal 540, a channel estimation configuration, a scrambling identifier associated with the first signal 540, and/or a coding configuration associated with the first signal 540.

In some aspects, the buffering configuration may configure one or more buffering operations of the forwarding component 530 with respect to buffering a digitized form of the first signal 540. In some aspects, the buffering configuration may indicate an ADC setting, a digital-to-analog converter (DAC) setting, an IQ sample compression setting, and/or an IQ sample decompression setting.

In some aspects, the forwarding configuration may configure one or more forwarding operations of the forwarding component 530 with respect to transmitting the second signal 545, which may be a regenerated form of the first signal 540 or a new signal that carries information about and/or from the first signal 540. In some aspects, the forwarding configuration may include a transmission beamforming configuration, a time domain resource associated with transmitting the second signal, a transmission power setting, a transmission amplification setting, a transmission center frequency, a numerology associated with transmitting the second signal, a digital transmitter beamforming configuration, RE mapping information associated with transmitting the second signal, a layer mapping configuration, a precoding configuration, a scrambling identifier associated with transmitting the second signal, and/or a coding configuration associated with transmitting the second signal.

In some aspects, the information request may configure one or more reporting operations of the forwarding component 530 with respect to providing information to the control node 510. The information may include information about the operation of the forwarding node 505, the configuration of the forwarding node 505, settings of the forwarding node 505, a channel, and/or a communication. In some aspects, the information request may include a request for a buffer status, a power status, a measurement report, a capability of the digital repeater, and/or a configuration of the forwarding node 505.

Figure 6:
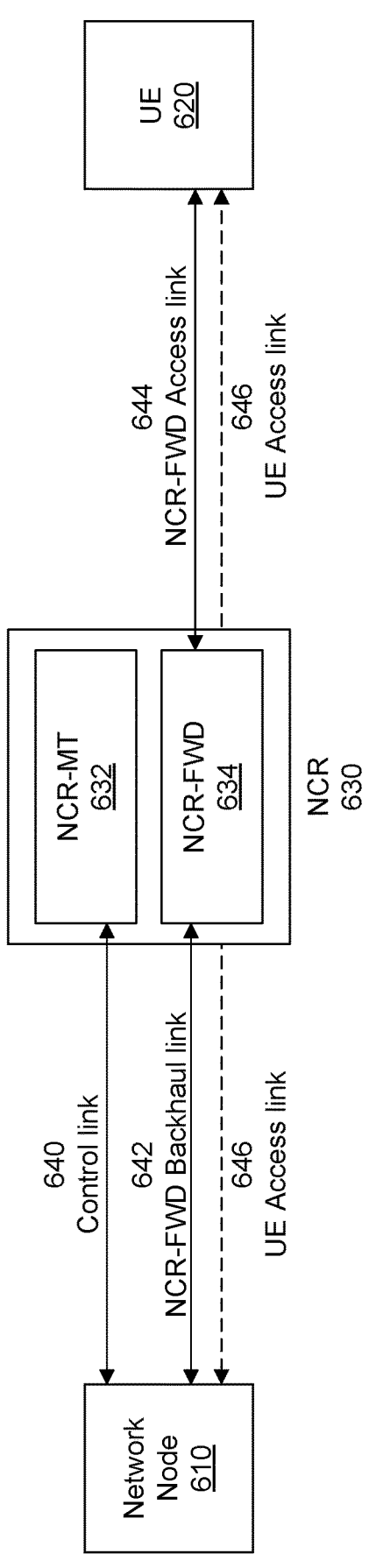
FIG. 6 is a diagram illustrating an example of a network-controlled repeater (NCR) node that forwards communications between a network node and a UE in accordance with the present disclosure.

FIG. 6 is a diagram illustrating an example 600 of a network-controlled repeater (NCR) node 630 that forwards communications between a network node 610 and a UE 620 in accordance with the present disclosure. As shown in FIG. 6, the NCR node 630 may include an NCR mobile termination (NCR-MT) component 632 that may communicate with the network node 610 over a control link 640 and an NCR forwarding (NCR-FWD) component 634 that may communicate with the network node 610 over a backhaul link 642 (shown as NCR-FWD backhaul link) and with the UE 620 over an access link 644 (shown as NCR-FWD access link). In some aspects, the network node 610 may be the network node 110, the CU 310, the DU 330, the first wireless node 405, the control node 510, and/or the wireless node 515/520 described herein. Furthermore, the UE 620 may be the UE 120, the second wireless node 415, and/or the wireless node 515/520 described herein, and the NCR node 630 may be the relay network node 110*d*, the RU 340, the forwarding node 410, and/or the forwarding node 505 described herein. Accordingly, as described herein, the NCR node 630 may be configured to receive, from the network node 610, a downlink access link transmission (for example, a PDCCH or a PDSCH) directed to the UE 620 via the NCR-FWD backhaul link 642, and may forward (for example, transmit a regenerated version of) the downlink access link transmission to the UE 620 via the NCR-FWD access link 644. In addition, the NCR node 630 may be configured to receive, from the UE 620, an uplink access link transmission (for example, a PUCCH or a PUSCH) directed to the network node 610 via the NCR-FWD access link 644, and may forward (for example, transmit a regenerated version of) the uplink access link transmission to the network node 610 via the NCR-FWD backhaul link 642. Accordingly, as shown, an access link 646 connection between the network node 610 and the UE 620 may include downlink and uplink traffic that is routed through the NCR node 630. For example, as described herein, the NCR-MT component 632 may communicate with the network node 610 via the control link 640, which may have a similar configuration as a Uu interface in an NR network, to exchange side control information, as described in more detail above with respect to FIG. 5.

Furthermore, the NCR-FWD component 634 may be configured to perform amplify-and-forward processing to repeat a downlink RF signal that is received from the network node 610 via the NCR-FWD backhaul link 642 and/or to repeat an uplink RF signal that is received from the UE 620 via the NCR-FWD access link 644. In some aspects, as described herein, various behaviors of the NCR-FWD component 634 may be controlled according to the side control information that the NCR-MT component 632 receives from the network node 610 via the control link 640. For example, as described herein, the side control information may include a reception configuration, a buffering configuration, a forwarding configuration, an information request, and/or any other suitable configuration or control information related to forwarding RF signals between the network node 610 and the UE 620. In some aspects, as described herein, the NCR node 630 may be configured as an in-band RF repeater to extend coverage in one or more frequency bands or frequency ranges (for example, in FR1 and/or FR2), and may be deployed in a single-hop stationary configuration that is transparent to the UE 620 (for example, there is only one NCR node 630 between the network node 610 and the UE 620, and the NCR node 630 is not moving or otherwise changing locations). Furthermore, in some aspects, the NCR node 630 may simultaneously maintain a first link with the network node 610 and a second link with the UE 620 such that RF signals can be repeated by the NCR node 630 with low additional latency.

Figure 7:
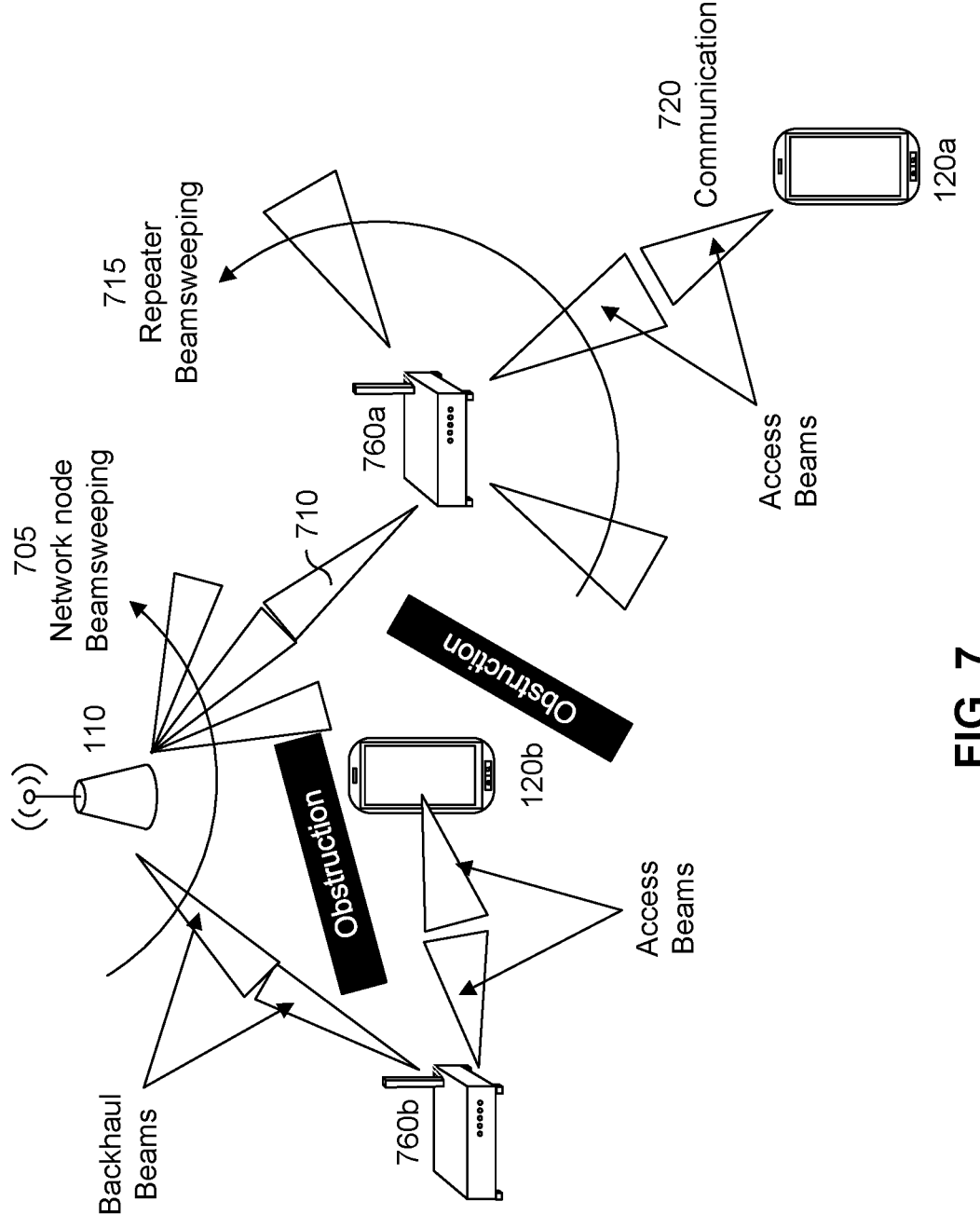
FIG. 7 is a diagram illustrating an example of communicating using a millimeter wave repeater in accordance with the present disclosure.

FIG. 7 is a diagram illustrating an example 700 of communicating using an mmWave repeater in accordance with the present disclosure. Because millimeter wave communications have a higher frequency and shorter wavelength than other types of radio waves used for communications (for example, sub-6 GHz communications), millimeter wave communications may have shorter propagation distances and may be more easily blocked by obstructions than other types of radio waves. For example, a wireless communication that uses sub-6 GHz radio waves may be capable of penetrating a wall of a building or a structure to provide coverage to an area on an opposite side of the wall from a network node 110 that communicates using the sub-6 GHZ radio waves. However, a millimeter wave may not be capable of penetrating the same wall (for example, depending on a thickness of the wall and/or a material from which the wall is constructed). Some techniques and apparatuses described herein use a repeater node 760a and/or 760b (for example, corresponding to NCR node 630) to increase the coverage area of a network node 110 and/or to extend coverage to UEs 120 (which include, in the example of FIG. 7, UE 120a and UE 120b) without line of sight to the network node 110 (for example, due to an obstruction).

For example, as shown in FIG. 7, an obstruction between the UE 120b and the network node 110 blocks or otherwise reduces the quality of a link between the network node 110 and the UE 120b. Similarly, an obstruction between the UE 120b and the repeater 760a blocks or otherwise reduces the quality of a link between the repeater 760a and the UE 120b. However, no obstructions or fewer obstructions exist between the repeater 760b and the UE 120b, whereby communications between the repeater 760b and the UE 120b may have a higher quality than communications between the network node 110 and the UE 120b or between the repeater 760a and the UE 120b. Furthermore, the millimeter wave repeater 760 described herein may be an L1 or an analog mmWave repeater, which is associated with a lower cost, less processing, and lower latency than an L2 or L3 repeater.

As described herein, the mmWave repeater 760 (sometimes referred to herein as a repeater 760) may perform directional communication by using beamforming to communicate with a network node 110 via a first beam pair (for example, a backhaul beam pair over a backhaul link with the network node 110) and to communicate with a UE 120 via a second beam pair (for example, an access beam pair over an access link with the UE 120). For example, in example 700, the repeater 760a can communicate with the network node 110 via a first beam pair and can communicate with the UE 120a via a second beam pair. Similarly, the repeater 760b can communicate with the network node 110 via a first beam pair and can communicate with the UE 120a via a second beam pair. A beam pair may refer to a Tx beam used by a first device for transmission and an Rx beam used by a second device for reception of information transmitted by the first device via the Tx beam.

As shown by reference number 705, a network node 110 may use a beam sweeping procedure to transmit communications via multiple beams over time (for example, using time division multiplexing (TDM)). As shown by reference number 710, the repeater 760a may receive a communication via an Rx beam of the repeater 760a. As shown by reference number 715, the repeater 760a may relay each received communication via multiple Tx beams of the repeater 760a (for example, using TDM). As used herein, relaying a communication may refer to transmitting the received communication (for example, after amplifying the received communication) without decoding the received communication and/or without modifying information carried in the received communication. Alternatively, relaying a received communication may refer to transmitting the received communication after decoding the received communication and/or modifying information carried in the received communication. In some aspects, a received communication may be relayed using a different time resource, a different frequency resource, and/or a different spatial resource (for example, a different beam) to transmit the communication as compared to a time resource, a frequency resource, and/or a spatial resource in which the communication was received. As shown by reference number 720, a UE 120a may receive a relayed communication. In some aspects, the UE 120a may generate a communication to be transmitted to the network node 110. The UE 120a may then transmit the communication to the repeater 760a for relaying to the network node 110.

Figure 8:
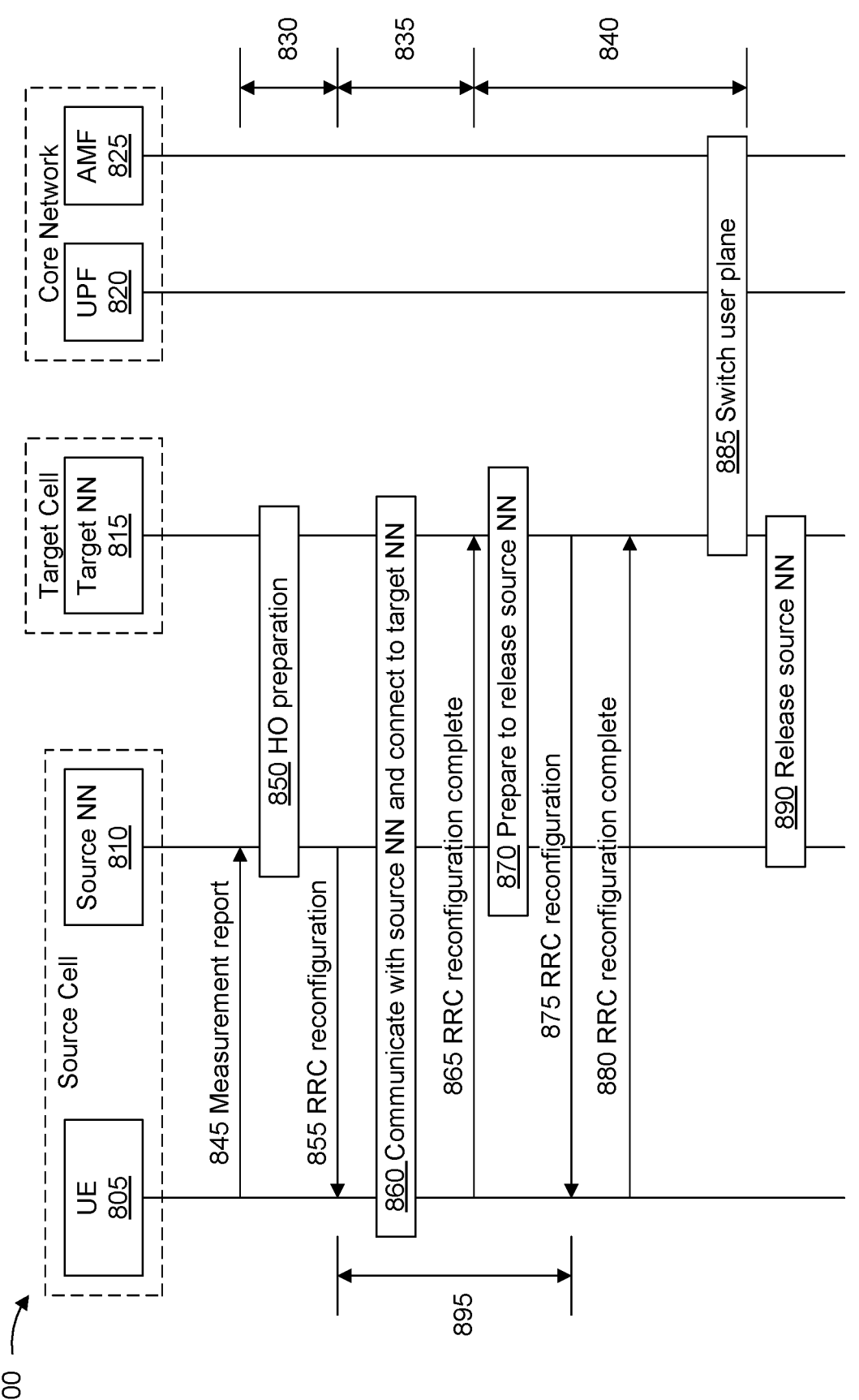
FIG. 8 is a diagram illustrating an example of a make-before-break handover in accordance with the present disclosure.

FIG. 8 is a diagram illustrating an example 800 of a make-before-break (MBB) handover in accordance with the present disclosure. As shown in FIG. 8, an MBB handover procedure may involve a UE 805, a source network node 810, a target network node 815, a user plane function (UPF) device 820, and an access and mobility management function (AMF) device 825. In some examples, actions described as being performed by a network node may be performed by multiple network nodes. For example, configuration actions and/or core network communication actions may be performed by a first network node (for example, a CU or a DU), and radio communication actions may be performed by a second network node (for example, a DU or an RU). The UE 805 may correspond to the UE 120 described elsewhere herein. The source network node 810 and/or the target network node 815 may correspond to the network node 110 described elsewhere herein. The UPF device 820 and/or the AMF device 825 may correspond to the network controller 130 described elsewhere herein. The UE 805 and the source network node 810 may be connected (for example, may have an RRC connection) via a serving cell or a source cell, and the UE 805 may undergo a handover to the target network node 815 via a target cell. The UPF device 820 and/or the AMF device 825 may be located within a core network. The source network node 810 and the target network node 815 may be in communication with the core network for mobility support and user plane functions. The MBB handover procedure may include an enhanced MBB (eMBB) handover procedure.

As shown, the MBB handover procedure may include a handover preparation phase 830, a handover execution phase 835, and a handover completion phase 840. During the handover preparation phase 830, the UE 805 may report measurements that cause the source network node 810 and/or the target network node 815 to prepare for handover and trigger execution of the handover. During the handover execution phase 835, the UE 805 may execute the handover by performing a random access channel (RACH) procedure with the target network node 815 and establishing an RRC connection with the target network node 815. During the handover completion phase 840, the source network node 810 may forward one or more stored communications associated with the UE 805 to the target network node 815, and the UE 805 may be released from a connection with the source network node 810.

As shown in FIG. 8, in a first operation 845, the UE 805 may perform one or more measurements (for example, serving cell measurements and/or neighbor cell measurements), and may transmit a measurement report associated with the one or more measurements to the source network node 810. The measurement report may indicate, for example, an RSRP parameter, an RSRQ parameter, an RSSI parameter, and/or a SINR parameter (for example, for the serving cell and/or one or more neighbor cells). The source network node 810 may use the measurement report to determine whether to trigger a handover to the target network node 815. For example, if one or more measurements satisfy a condition, then the source network node 810 may trigger a handover of the UE 805 to the target network node 815.

In a second operation 850, the source network node 810 and the target network node 815 may communicate with one another to prepare for a handover of the UE 805. As part of the handover preparation, the source network node 810 may transmit a handover request to the target network node 815 to instruct the target network node 815 to prepare for the handover. The source network node 810 may communicate RRC context information associated with the UE 805 and/or configuration information associated with the UE 805 to the target network node 815. The target network node 815 may prepare for the handover by reserving resources for the UE 805. After reserving the resources, the target network node 815 may transmit an ACK to the source network node 810 in response to the handover request.

In a third operation 855, the source network node 810 may transmit an RRC reconfiguration message to the UE 805. The RRC reconfiguration message may include a handover command instructing the UE 805 to execute a handover procedure from the source network node 810 to the target network node 815. The handover command may include information associated with the target network node 815, such as a RACH preamble assignment for accessing the target network node 815. Reception of the RRC reconfiguration message, including the handover command, by the UE 805 may trigger the start of the handover execution phase 835.

In a fourth operation 860, during the handover execution phase 835 of the MBB handover, the UE 805 may execute the handover by performing a random access procedure with the target network node 815 (for example, including synchronization with the target network node 815) while continuing to communicate with the source network node 810. For example, while the UE 805 is performing the RACH procedure with the target network node 815, the UE 805 may transmit uplink data, uplink control information, and/or an uplink reference signal (for example, an SRS) to the source network node 810, and/or may receive downlink data, downlink control information, and/or a downlink reference signal from the source network node 810.

In a fifth operation 865, upon successfully establishing a connection with the target network node 815 (for example, via a RACH procedure), the UE may transmit an RRC reconfiguration completion message to the target network node 815. Reception of the RRC reconfiguration message by the target network node 815 may trigger the start of the handover completion phase 840.

In a sixth operation 870, the source network node 810 and the target network node 815 may communicate with one another to prepare for release of the connection between the source network node 810 and the UE 805. In some aspects, the target network node 815 may determine that a connection between the source network node 810 and the UE 805 is to be released, such as after receiving the RRC reconfiguration message from the UE 805. In this case, the target network node 815 may transmit a handover connection setup completion message to the source network node 810. The handover connection setup completion message may cause the source network node 810 to stop transmitting data to the UE 805 and/or to stop receiving data from the UE 805. Additionally or alternatively, the handover connection setup completion message may cause the source network node 810 to forward communications associated with the UE 805 to the target network node 815 and/or to notify the target network node 815 of a status of one or more communications with the UE 805. For example, the source network node 810 may forward, to the target network node 815, buffered downlink communications (for example, downlink data) for the UE 805 and/or uplink communications (for example, uplink data) received from the UE 805. Additionally or alternatively, the source network node 810 may notify the target network node 815 regarding a PDCP status associated with the UE 805 and/or a sequence number to be used for a downlink communication with the UE 805.

In a seventh operation 875, the target network node 815 may transmit an RRC reconfiguration message to the UE 805 to instruct the UE 805 to release the connection with the source network node 810. Upon receiving the instruction to release the connection with the source network node 810, the UE 805 may stop communicating with the source network node 810. For example, the UE 805 may refrain from transmitting uplink communications to the source network node 810 and/or may refrain from monitoring for downlink communications from the source network node 810.

In a ninth operation 880, the UE may transmit an RRC reconfiguration completion message to the target network node 815 to indicate that the connection between the source network node 810 and the UE 805 is being released or has been released.

In a tenth operation 885, the target network node 815, the UPF device 820, and/or the AMF device 825 may communicate to switch a user plane path of the UE 805 from the source network node 810 to the target network node 815. Prior to switching the user plane path, downlink communications for the UE 805 may be routed through the core network to the source network node 810. After the user plane path is switched, downlink communications for the UE 805 may be routed through the core network to the target network node 815. Upon completing the switch of the user plane path, the AMF device 825 may transmit an end marker message to the source network node 810 to signal completion of the user plane path switch. In an eleventh operation 890, the target network node 815 and the source network node 810 may communicate to release the source network node 810.

As part of the MBB handover procedure, the UE 805 may maintain simultaneous connections with the source network node 810 and the target network node 815 during a time period 895. The time period 895 may start at the beginning of the handover execution phase 835 (for example, upon reception by the UE 805 of a handover command from the source network node 810) when the UE 805 performs a RACH procedure with the target network node 815. The time period 895 may end upon release of the connection between the UE 805 and the source network node 810 (for example, upon reception by the UE 805 of an instruction, from the target network node 815, to release the source network node 810). By maintaining simultaneous connections with the source network node 810 and the target network node 815, the handover procedure can be performed with zero or a minimal interruption to communications, thereby reducing latency.

Figure 9:
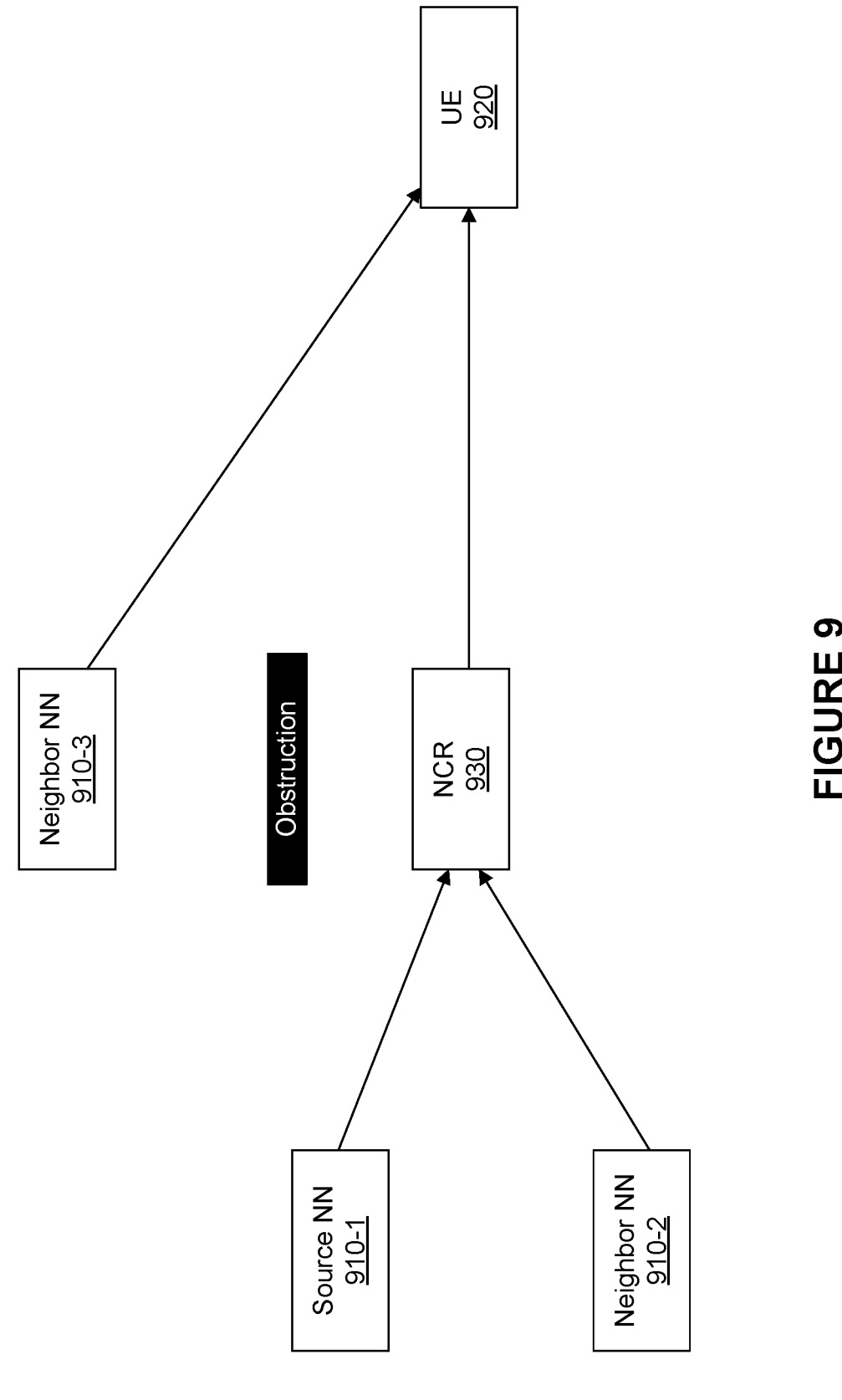
FIG. 9 is a diagram illustrating an example of a handover decision in a scenario where an NCR node is used to forward communications between a network node and a UE in accordance with the present disclosure.

FIG. 9 is a diagram illustrating an example 900 of a handover decision in a scenario where an NCR node is used to forward communications between a network node and a UE in accordance with the present disclosure. As shown in FIG. 9, example 900 includes multiple network nodes 910, including a first network node 910-1 that provides a first cell, a second network node 910-1 that provides a second cell, and a third network node 910-3 that provides a third cell. In some aspects, the first network node 910-1 and the second network node 920-2 may be connected to the NCR node 930 via respective control links and backhaul links, and the NCR node 930 may be connected to the UE 920 via an access link. Accordingly, the UE 920 may be able to communicate with the first network node 910-1 and/or the second network node 910-2 via the NCR node 930. However, an obstruction is blocking the link between the NCR node 930 and the network node 910-3, whereby the NCR node 930 cannot forward any RF signals to or from the network node 910-3 and the UE 920 can only connect to the network node 910-3 directly.

In the example 900 shown in FIG. 9, the UE 920 may initially be connected to a wireless network through the first cell provided by the network node 910-1. Accordingly, the network node 910-1 may be operating as a source network node for the UE 920, and the network nodes 910-2 and 910-3 may be candidate neighbor cells to which the UE 920 may be handed over (for example, in cases where the link quality for the source network node 910-1 becomes degraded). In one example scenario, at the NCR node 930, the received signal strength from the first network node 910-1 may be stronger than the received signal strength from the second network node 910-2, and the received signal strength from the second network node 910-2 may be stronger than the received signal strength from the third network node 910-3 (for example, due to the obstruction blocking the link between the NCR node 930 and the third network node 910-3 and preventing the NCR node 930 from being able to forward RF signals to or from the third network node 930). In some aspects, as described herein, the NCR node 930 may include an NCR-MT component that communicates with one or more network nodes 910 to exchange control information, and the NCR-MT component may be configured to perform frequent measurements on reference signals transmitted by cells associated with neighboring network nodes 910. However, in cases where the backhaul link between the NCR node 930 and the current (for example, source) network node 910-1 becomes weak (for example, fails to satisfy a threshold), the weak quality of the backhaul link between the source network node 910-1 and the NCR node 930 may impact the end-to-end link quality between the UE 920 and the source network node 910-1.

However, the source network node 910-1 may lack sufficient information to make a handover decision for the UE 920 that takes into consideration the end-to-end link quality between the UE 920 and each potential candidate cell. For example, in some cases, measurements obtained by the NCR-MT component of the NCR node 930 may indicate that the backhaul link between the NCR node 930 and the second network node 910-2 is better than the backhaul link between the NCR node 930 and the first network node 910-1. However, the UE 920 may be forced to connect directly to the third network node 910-3 because the UE 920 can only receive reference signal transmissions from the third network node 910-3, even though the link quality associated with the third network node 910-3 may potentially be worse than the link quality associated with the second network node 910-2 that forwards RF signals through the NCR node 930.

In some cases, one technique that can be used to enable handover decisions when the NCR node 930 is present is to configure the NCR node 930 to start forwarding signals from neighboring network nodes (for example, network node 910-2) connected to the NCR node 930 so that the UE 920 can obtain appropriate measurements for the neighboring network nodes. For example, if the backhaul link between the source network node 910-1 and the NCR node 930 fails, then the end-to-end link between the source network node 910-1 and the UE 920 fails. Accordingly, the NCR node 930 may be configured to forward signals from neighboring network nodes connected to the NCR node 930 so that the UE 920 can obtain measurements for the neighboring network nodes before the end-to-end link between the source network node 910-1 and the UE 920 fails and the UE 920 is forced to directly connect to a (potentially suboptimal) neighboring network node from which the UE 920 is able to receive a reference signal. However, this technique incurs additional signaling overhead because the neighboring network nodes need to send control information to the NCR node 930 and the UE 920 needs to send information related to the measurements to the source network node 910-1 via the NCR node 930, which impacts resource utilization. Additionally or alternatively, forwarding signals from the neighboring network nodes and relying on measurements obtained by the UE 920 may incur additional latency (for example, due to the propagation delay associated with forwarding the RF signals to the UE 920, the measurements performed by the UE 920, and/or the propagation delay associated with the UE 920 transmitting the measurements to the source network node 910-1 through the NCR node 930).

Additionally or alternatively, another technique to enable handover decisions when the NCR node 930 is present is to allow the NCR node 930 to forward RF signals from neighboring cells (for example, network node 910-2) while the NCR-MT component is connected to a different cell (for example, network node 910-1). In such cases, the UE 920 may perform cell measurements in advance, which may avoid the latency that would otherwise be incurred in cases where the UE 920 starts to measure neighboring cells only after the link quality of a source cell has degraded. However, although this technique may offer lower latency compared to techniques where the NCR node 930 starts to forward RF signals from neighboring cells after the link quality of a source cell has degraded, this technique also introduces additional signaling overhead. For example, configuring the NCR node 930 to forward RF signals from neighboring cells while the NCR-MT component is connected to a different cell may incur signaling overhead due to the need for coordination between the NCR node 930, the source cell connected to the NCR node 930, and the neighboring cells that are able to connect to the NCR node 930 in order to ensure that the NCR node 930 is able to forward the RF signals to the UE 920 for measurement purposes. Additionally or alternatively, an implementation or configuration of the NCR node 930 may lack support for forwarding RF signals from more than one network node 910. Furthermore, in techniques that rely upon the UE 920 performing measurements of neighboring cells, the NCR node 930 may use different gain or transmit power levels for different cells. Accordingly, if a handover decision were to be based solely on measurements related to a link between a cell and the NCR node 930, the handover decision may lead to the UE 920 connecting to a target cell with an end-to-end link that has insufficient quality.

Various aspects relate generally to techniques for making a handover decision when a UE is connected to an NCR node in accordance with an estimated end-to-end link quality between the UE and one or more network nodes connected to the NCR node. Some aspects more specifically relate to an NCR node that may obtain measurements related to backhaul links between the NCR node and the one or more network nodes and one or more measurements related to an access link between the NCR node and the UE, which may be used to estimate the end-to-end link quality between the UE and each network node that is connected to the NCR node. For example, in some aspects, the NCR node may use the measurements related to the backhaul links and the access link in addition to information related to a gain and/or transmit power that the NCR node is using to forward RF signals to estimate the end-to-end link quality between the UE and each network node connected to the NCR node. The NCR node may then send information indicating the estimated end-to-end link quality between the UE and each network node to a current serving cell for the UE, which may use the estimated end-to-end link quality between the UE and each network node to make handover decisions for the UE. Additionally or alternatively, the NCR node may send information indicating the measurements related to the backhaul link quality and the access link quality in addition to information related to the gain and/or transmit power used to forward RF signals to the current serving cell for the UE, which may then estimate the end-to-end link quality between the UE and each network node to make handover decisions for the UE.

Particular aspects of the subject matter described in this disclosure can be implemented to realize one or more of the following potential advantages. In some examples, the described techniques can be used to make a handover decision for a UE that considers the end-to-end link quality between the UE and a candidate neighbor cell that uses an NCR node to forward RF signals to the UE. For example, the end-to-end link quality for a particular network node may generally depend on a link quality associated with a backhaul link between a network node and the NCR node and a link quality associated with an access link between the NCR node and the UE. Accordingly, because the NCR node is performing frequent measurements of the backhaul link and the access link, the NCR node may have access to sufficient information to estimate the end-to-end link quality between the UE and each candidate network node that forwards RF signals through the NCR node. In this way, rather than restricting handovers to one or more network nodes from which the UE can directly receive a reference signal, which may potentially offer poorer end-to-end link quality than a network node that is forwarding RF signals through the NCR node, the frequent measurements performed by the NCR node may enable handover decisions in accordance with end-to-end link quality estimates with low signaling overhead and low latency (for example, relative to other handover schemes in which the UE performs cell measurements that are reported to the network and/or other handover schemes that do not consider variations in gain or transmit power that the NCR node uses for different cells).

Figure 10:
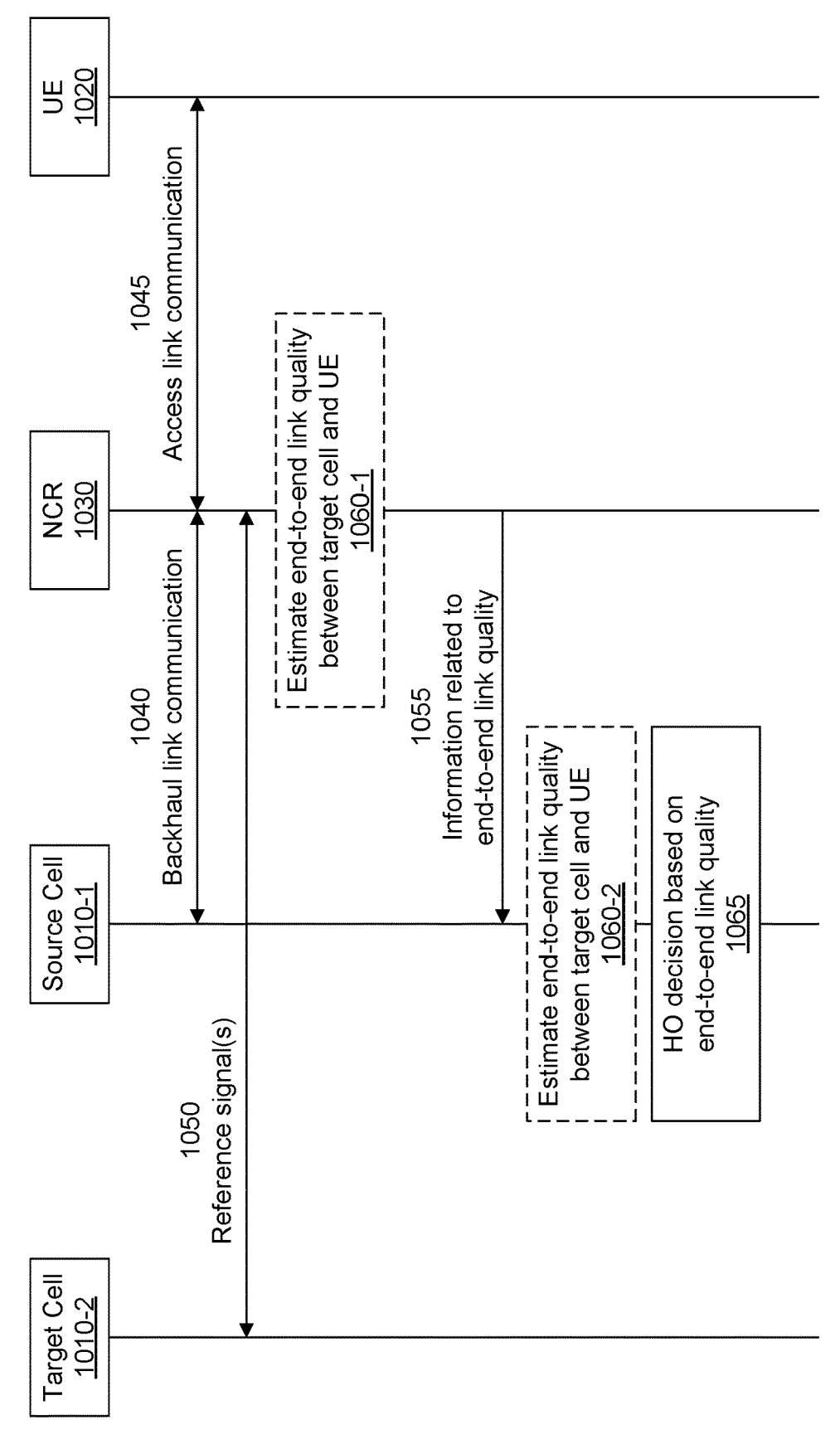
FIG. 10 is a diagram illustrating an example associated with a repeater handover decision based on end-to-end link quality in accordance with the present disclosure.

FIG. 10 is a diagram illustrating an example 1000 associated with a repeater handover decision based on end-to-end link quality in accordance with the present disclosure. As shown in FIG. 10, example 1000 includes communication between a first network node 1010-1, a second network node 1010-2, a UE 1020, and an NCR node 1030. In some aspects, the first network node 1010-1 may provide a source cell for the UE 1020, and the NCR node 1030 may be configured to perform an amplify-and-forward technique to forward downlink and uplink communications between the first network node 1010-1 and the UE 1020. Furthermore, the second network node 1010-2 may provide a target cell for the UE 1020, such as a neighbor cell that the UE 1020 may be handed over to in accordance with an end-to-end link quality between the UE 1020 and the first network node 1010-1 and an end-to-end link quality between the UE 1020 and the second network node 1010-2.

For example, in a first operation 1040, the NCR node 1030 may communicate with the first network node 1010-1 associated with the source cell over a backhaul link. For example, as described herein, the NCR node 1030 may include an NCR-MT component that communicates with the first network node 1010-1 over a control link to exchange side control information. In addition, the NCR node 1030 may include an NCR-FWD component that performs amplify-and-forward processing on uplink and downlink signals that are communicated between the first network node 1010-1 and the UE 1020 via the NCR node 1030 in accordance with the side control information received via the control link. Accordingly, in some aspects, the NCR node 1030 may obtain measurements that relate to the backhaul link between the first network node 1010-1 and the NCR node 1030 (for example, RSRP, RSRQ, RSSI, SINR, and/or other suitable measurements) based on the RF signals that are received from and/or transmitted to the first network node 1010-1. Furthermore, in a second operation 1045, the NCR node 1030 may communicate with the UE 1020 over an access link (for example, an NCR-FWD access link). For example, as described herein, the first network node 1010-1 may transmit one or more downlink communications (for example, one or more PDCCH and/or PDSCH communications) that are directed to the UE 1020, which may be received by the NCR node 1030 via the NCR-FWD backhaul link, amplified according to a gain setting associated with the first network node 1010-1, and forwarded to the UE 1020 via the NCR-FWD access link using a transmit power associated with the first network node 1010-1. Similarly, the UE 1020 may transmit one or more uplink communications (for example, one or more PUCCH and/or PUSCH communications) that are directed to the first network node 1010-1, which may be received by the NCR node 1030 via the NCR-FWD access link, amplified according to the gain setting associated with the first network node 1010-1, and forwarded to the first network node 1010-1 via the NCR-FWD backhaul link using the transmit power associated with the first network node 1010-1.

In this way, the NCR node 1030 may obtain a set of parameters that relate to the end-to-end link quality between the UE 1020 and the first network node 1010-1. For example, the parameters that relate to the end-to-end link quality between the UE 1020 and the first network node 1010-1 may include one or more measurements related to the quality of the backhaul link between the NCR node 1030 and the first network node 1010-1 (for example, in accordance with measurements that the NCR-MT component is configured to obtain). In addition, the parameters that relate to the end-to-end link quality between the UE 1020 and the first network node 1010-1 may include one or more measurements related to the quality of the access link between the NCR node 1030 and the UE 1020, which the NCR node 1030 may obtain based on measurements that are performed when the NCR node 1030 receives uplink transmissions from the UE 1020. In addition, the parameters that relate to the end-to-end link quality between the UE 1020 and the first network node 1010-1 may include the gain and/or the transmit power that the NCR node 1030 uses to forward communications from the first network node 1010-1 to the UE 1020 and/or from the UE 1020 to the first network node 1010-1.

In some aspects, in a third operation 1050, the NCR node 1030 may receive and measure one or more reference signals that are transmitted by the second network node 1010-2, which provides a neighbor cell that is a candidate for a potential handover of the UE 1020. In some aspects, the one or more reference signal measurements may be used to obtain a set of parameters that relate to the end-to-end link quality between the UE 1020 and the second network node 1010-2 providing the candidate neighbor cell. For example, the parameters that relate to the end-to-end link quality between the UE 1020 and the second network node 1010-2 may include one or more measurements related to the quality of the backhaul link between the NCR node 1030 and the second network node 1010-2 (for example, in accordance with measurements that the NCR-MT component is configured to obtain from the reference signal transmissions). In addition, the parameters that relate to the end-to-end link quality between the UE 1020 and the first network node 1010-2 may include the one or more measurements related to the quality of the access link between the NCR node 1030 and the UE 1020, which the NCR node 1030 obtains when the NCR node 1030 receives uplink transmissions from the UE 1020. In addition, the parameters that relate to the end-to-end link quality between the UE 1020 and the second network node 1010-2 may include a gain and/or a transmit power that the NCR node 1030 is configured to use to forward communications from and/or to the second network node 1010-2.

In a fourth operation 1055, the NCR node 1030 may send, to the first network node 1010-1, information related to the end-to-end link quality between the UE 1020 and each of the first network node 1010-1 and the second network node 1010-2. For example, in a fifth operation 1060-1 (for example, that occurs before the fourth operation 1055), the NCR node 1030 may use the measurements related to the backhaul link quality between the NCR node 1030 and each respective network node 1010, the measurements related to the access link between the NCR node 1030 and the UE 1020, and the parameters related to the gain and/or transmit power that the NCR node 1030 uses to forward RF signals for each of the network nodes 1010 to estimate the end-to-end link quality between the UE 1020 and each of the first network node 1010-1 and the second network node 1010-2. In this case, in the fourth operation 1055, the information sent from the NCR node 1030 to the first network node 1010-1 may include the estimated end-to-end link quality that the NCR node 1030 calculated for each of the first network node 1010-1 and the second network node 1010-2. Alternatively, in some aspects, the information sent from the NCR node 1030 to the first network node 1010-1 may include the parameters related to the end-to-end link quality for each of the first network node 1010-1 and the second network node 1010-2, such as the measurements related to the backhaul link quality for each network node 1010, the measurements related to the access link quality for the UE

1020, and the parameters related to the gain and/or transmit power that the NCR node 1030 applies to amplify-and-forward RF signals for each respective network node 1010. In such cases, in a sixth operation 1060-2 (for example, that occurs after the fourth operation 1055), the first network node 1010-1 may estimate the end-to-end link quality for each of the first network node 1010-1 and the second network node 1010-2 based on the parameters provided by the NCR node 1030.

As further shown in FIG. 10, in a seventh operation 1065, the first network node 1010-1 may make a handover decision for the UE 1020 in accordance with the end-to-end link quality between the UE 1020 and each of the first network node 1010-1 and the second network node 1010-2. For example, in some aspects, the end-to-end link quality may be estimated for each access link beam between the NCR node 1030 and the UE 1020 and/or for each backhaul link beam between the NCR node 1030 and the respective network nodes 1010. Additionally or alternatively, the estimated end-to-end link quality may be an average value that is computed across multiple access link beams between the NCR node 1030 and the UE 1020 and/or across multiple backhaul link beams between the NCR node 1030 and the respective network nodes 1010. In either case, the first network node 1010-1 may then make the handover decision for the UE 1020 based on the end-to-end link quality between the UE 1020 and each of the first network node 1010-1 and the second network node 1010-2. For example, the first network node 1010-1 may determine that the UE 1020 is to be handed over to the second network node 1010-2 in cases where the end-to-end link quality between the UE 1020 and one or more of the first network node 1010-1 or the second network node 1010-2 satisfy a handover condition (for example, the end-to-end link quality between the UE 1020 and the first network node 1010-1 fails to satisfy a threshold, the end-to-end link quality between the UE 1020 and the second network node 1010-2 satisfies a threshold, and/or the end-to-end link quality between the UE 1020 and the second network node 1010-2 exceeds the end-to-end link quality between the UE 1020 and the first network node 1010-1 by a value that satisfies a threshold). Alternatively, the first network node 1010-1 may determine that the UE 1020 is to remain connected to the first network node 1010-1 in cases where the end-to-end link quality between the UE 1020 and one or more of the first network node 1010-1 or the second network node 1010-2 fails to satisfy a handover condition. Furthermore, in cases where the first network node 1010-1 determines that the UE 1020 is to be handed over to the second network node 1010-2, the first network node 1010-1 may initiate the handover process (for example, in a similar manner as described above with reference to FIG. 8). Additionally or alternatively, the first network node 1010-2 may send a handover request to a CU or a DU associated with the second network node 1010-2, which may accept or reject the handover request. Furthermore, in cases where the first network node 1010-2 sends a handover request to the CU or the DU associated with the second network node 1010-2, the handover request may include all or a subset of the information that is used to compute the end-to-end quality between the UE 1020 and the respective network nodes 1010 (for example, the gain and/or transmit power that the NCR node 1030 uses to amplify-and-forward RF signals).

FIG. 11 is a flowchart illustrating an example process 1100 performed, for example, by a network node that supports a repeater handover decision based on end-to-end link quality in accordance with the present disclosure.

Example process 1100 is an example where the network node (for example, network node 110) performs operations associated with a repeater handover decision based on end-to-end link quality.

As shown in FIG. 11, in some aspects, process 1100 may include receiving, from an NCR node, information that indicates an end-to-end link quality between a neighbor cell in communication with the NCR node and a UE in communication with the NCR node (block 1110). For example, the network node (such as by using communication manager 150 or reception component 1302, depicted in FIG. 13) may receive, from an NCR node, information that indicates an end-to-end link quality between a neighbor cell in communication with the NCR node and a UE in communication with the NCR node, as described above.

As further shown in FIG. 11, in some aspects, process 1100 may include transmitting, to the NCR node, control information to trigger a handover of the UE to the neighbor cell responsive to the information that indicates the end-to-end link quality between the neighbor cell and the UE (block 1120). For example, the network node (such as by using communication manager 150, transmission component 1304, or handover component 1308, depicted in FIG. 13) may transmit, to the NCR node, control information to trigger a handover of the UE to the neighbor cell responsive to the information that indicates the end-to-end link quality between the neighbor cell and the UE, as described above.

Process 1100 may include additional aspects, such as any single aspect or any combination of aspects described below or in connection with one or more other processes described elsewhere herein.

In a first additional aspect, the end-to-end link quality between the neighbor cell and the UE is associated with one or more measurements related to a backhaul link between the neighbor cell and the NCR node.

In a second additional aspect, alone or in combination with the first aspect, the end-to-end link quality between the neighbor cell and the UE is associated with one or more measurements related to an access link between the NCR node and the UE.

In a third additional aspect, alone or in combination with one or more of the first and second aspects, the end-to-end link quality between the neighbor cell and the UE is associated with one or more of a gain that the NCR node applies to forwarded RF signals or a transmit power that the NCR node applies to forwarded RF signals.

In a fourth additional aspect, alone or in combination with one or more of the first through third aspects, the end-to-end link quality is associated with an access beam that the NCR node uses to communicate with the UE.

In a fifth additional aspect, alone or in combination with one or more of the first through fourth aspects, the end-to-end link quality is associated with a backhaul beam that the NCR node uses to communicate with the neighbor cell.

In a sixth additional aspect, alone or in combination with one or more of the first through fifth aspects, process 1100 includes sending, to the neighbor cell, a handover request message to request the handover of the UE to the neighbor cell.

In a seventh additional aspect, alone or in combination with one or more of the first through sixth aspects, process 1100 includes sending, to the neighbor cell, one or more parameters related to the end-to-end link quality between the neighbor cell and the UE.

Although FIG. 11 shows example blocks of process 1100, in some aspects, process 1100 may include additional blocks, fewer blocks, different blocks, or differently arranged blocks than those depicted in FIG. 11. Additionally or alternatively, two or more of the blocks of process 1100 may be performed in parallel.

FIG. 12 is a flowchart illustrating an example process 1200 performed, for example, by a network node that supports a repeater handover decision based on end-to-end link quality in accordance with the present disclosure. Example process 1200 is an example where the network node (for example, network node 110) performs operations associated with a repeater handover decision based on end-to-end link quality.

As shown in FIG. 12, in some aspects, process 1200 may include receiving, from an NCR node, one or more parameters related to an end-to-end link quality between a neighbor cell in communication with the NCR node and a UE in communication with the NCR node (block 1210). For example, the network node (such as by using communication manager 150 or reception component 1302, depicted in FIG. 13) may receive, from an NCR node, one or more parameters related to an end-to-end link quality between a neighbor cell in communication with the NCR node and a UE in communication with the NCR node, as described above.

As further shown in FIG. 12, in some aspects, process 1200 may include estimating the end-to-end link quality between the neighbor cell and the UE in accordance with the one or more parameters (block 1220). For example, the network node (such as by using communication manager 150 or estimation component 1310, depicted in FIG. 13) may estimate the end-to-end link quality between the neighbor cell and the UE in accordance with the one or more parameters, as described above.

As further shown in FIG. 12, in some aspects, process 1200 may include transmitting, to the NCR node, control information to trigger a handover of the UE to the neighbor cell responsive to the estimated end-to-end link quality between the neighbor cell and the UE (block 1230). For example, the network node (such as by using communication manager 150, transmission component 1304, or handover component 1308, depicted in FIG. 13) may transmit, to the NCR node, control information to trigger a handover of the UE to the neighbor cell responsive to the estimated end-to-end link quality between the neighbor cell and the UE, as described above.

Process 1200 may include additional aspects, such as any single aspect or any combination of aspects described below or in connection with one or more other processes described elsewhere herein.

In a first additional aspect, the one or more parameters related to the end-to-end link quality between the neighbor cell and the UE include one or more measurements related to a backhaul link between the neighbor cell and the NCR node.

In a second additional aspect, alone or in combination with the first aspect, the one or more parameters related to the end-to-end link quality between the neighbor cell and the UE include one or more measurements related to an access link between the NCR node and the UE.

In a third additional aspect, alone or in combination with one or more of the first and second aspects, the one or more parameters related to the end-to-end link quality between the neighbor cell and the UE include one or more of a gain that the NCR node applies to forwarded RF signals or a transmit power that the NCR node applies to forwarded RF signals.

In a fourth additional aspect, alone or in combination with one or more of the first through third aspects, the end-to-end link quality is estimated for an access beam that the NCR node uses to communicate with the UE.

In a fifth additional aspect, alone or in combination with one or more of the first through fourth aspects, the end-to-end link quality is estimated for a backhaul beam that the NCR node uses to communicate with the neighbor cell.

In a sixth additional aspect, alone or in combination with one or more of the first through fifth aspects, process 1200 includes sending, to the neighbor cell, a handover request message to request the handover of the UE to the neighbor cell.

In a seventh additional aspect, alone or in combination with one or more of the first through sixth aspects, process 1200 includes sending, to the neighbor cell, information indicating the one or more parameters related to the end-to-end link quality between the neighbor cell and the UE.

Although FIG. 12 shows example blocks of process 1200, in some aspects, process 1200 may include additional blocks, fewer blocks, different blocks, or differently arranged blocks than those depicted in FIG. 12. Additionally or alternatively, two or more of the blocks of process 1200 may be performed in parallel.

Figure 13:
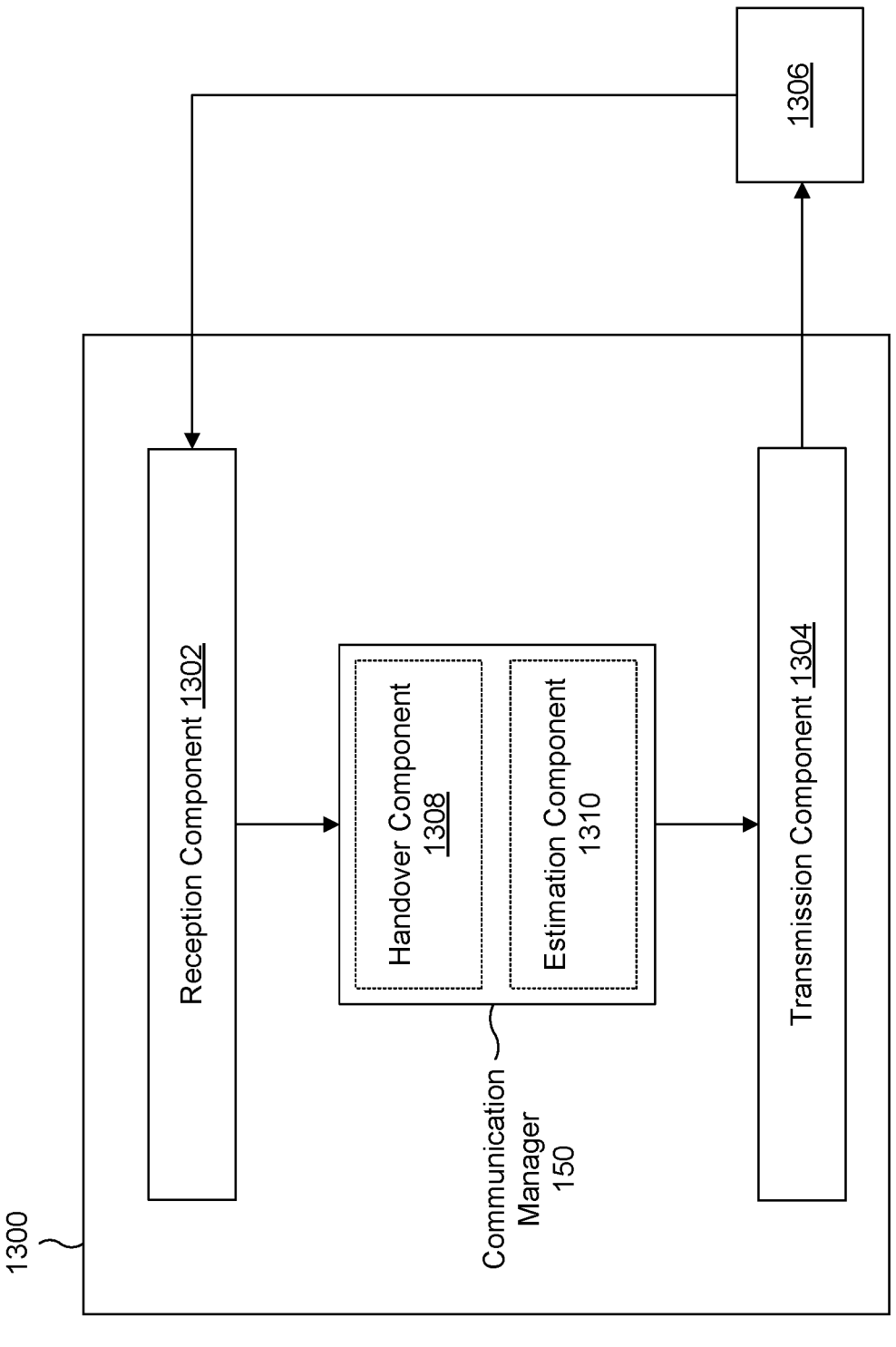
FIG. 13 is a diagram of an example apparatus for wireless communication in accordance with the present disclosure.

FIG. 13 is a diagram of an example apparatus 1300 for wireless communication that supports a repeater handover decision based on end-to-end link quality in accordance with the present disclosure. The apparatus 1300 may be a network node, or a network node may include the apparatus 1300. In some aspects, the apparatus 1300 includes a reception component 1302, a transmission component 1304, and a communication manager 150, which may be in communication with one another (for example, via one or more buses). As shown, the apparatus 1300 may communicate with another apparatus 1306 (such as a UE, a network node, or another wireless communication device) using the reception component 1302 and the transmission component 1304.

In some aspects, the apparatus 1300 may be configured to and/or operable to perform one or more operations described herein in connection with FIG. 10. Additionally or alternatively, the apparatus 1300 may be configured to and/or operable to perform one or more processes described herein, such as process 1100 of FIG. 11, and/or process 1200 of FIG. 12. In some aspects, the apparatus 1300 may include one or more components of the network node described above in connection with FIG. 2.

The reception component 1302 may receive communications, such as reference signals, control information, and/or data communications, from the apparatus 1306. The reception component 1302 may provide received communications to one or more other components of the apparatus 1300, such as the communication manager 150. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1302 may include one or more antennas, a modem, a demodulator, a MIMO detector, a receive processor, a controller/processor, and/or a memory of the network node described above in connection with FIG. 2.

The transmission component 1304 may transmit communications, such as reference signals, control information, and/or data communications, to the apparatus 1306. In some aspects, the communication manager 150 may generate communications and may transmit the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modem, a modulator, a transmit MIMO processor, a transmit processor, a controller/processor, and/or a memory of the network node described above in connection with FIG. 2. In some aspects, the transmission component 1304 may be co-located with the reception component 1302 in a transceiver.

The communication manager 150 may receive or may cause the reception component 1302 to receive, from an NCR node, information that indicates an end-to-end link quality between a neighbor cell in communication with the NCR node and a UE in communication with the NCR node. The communication manager 150 may transmit or may cause the transmission component 1304 to transmit, to the NCR node, control information to trigger a handover of the UE to the neighbor cell responsive to the information that indicates the end-to-end link quality between the neighbor cell and the UE. In some aspects, the communication manager 150 may perform one or more operations described elsewhere herein as being performed by one or more components of the communication manager 150.

The communication manager 150 may receive or may cause the reception component 1302 to receive, from an NCR node, one or more parameters related to an end-to-end link quality between a neighbor cell in communication with the NCR node and a UE in communication with the NCR node. The communication manager 150 may estimate the end-to-end link quality between the neighbor cell and the UE in accordance with the one or more parameters. The communication manager 150 may transmit or may cause the transmission component 1304 to transmit, to the NCR node, control information to trigger a handover of the UE to the neighbor cell responsive to the estimated end-to-end link quality between the neighbor cell and the UE. In some aspects, the communication manager 150 may perform one or more operations described elsewhere herein as being performed by one or more components of the communication manager 150.

The communication manager 150 may include a controller/processor, a memory, a scheduler, and/or a communication unit of the network node described above in connection with FIG. 2. In some aspects, the communication manager 150 includes a set of components, such as a handover component 1308 and/or an estimation component 1310. Alternatively, the set of components may be separate and distinct from the communication manager 150. In some aspects, one or more components of the set of components may include or may be implemented within a controller/processor, a memory, a scheduler, and/or a communication unit of the network node described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive, from an NCR node, information that indicates an end-to-end link quality between a neighbor cell in communication with the NCR node and a UE in communication with the NCR node. The handover component 1308 and/or the transmission component 1304 may transmit, to the NCR node, control information to trigger a handover of the UE to the neighbor cell responsive to the information that indicates the end-to-end link quality between the neighbor cell and the UE.

The reception component 1302 may receive, from an NCR node, one or more parameters related to an end-to-end link quality between a neighbor cell in communication with the NCR node and a UE in communication with the NCR node. The handover component 1308 and/or the estimation component 1310 may estimate the end-to-end link quality between the neighbor cell and the UE in accordance with the one or more parameters. The transmission component 1304 may transmit, to the NCR node, control information to trigger a handover of the UE to the neighbor cell responsive to the estimated end-to-end link quality between the neighbor cell and the UE.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally or alternatively, a set of (one or more) components shown in FIG. 13 may perform one or more functions described as being performed by another set of components shown in FIG. 13.

The following provides an overview of some Aspects of the present disclosure:

Aspect 1: A method of wireless communication performed by a network node, comprising: receiving, from an NCR node, information that indicates an end-to-end link quality between a neighbor cell in communication with the NCR node and a UE in communication with the NCR node; and transmitting, to the NCR node, control information to trigger a handover of the UE to the neighbor cell responsive to the information that indicates the end-to-end link quality between the neighbor cell and the UE.

Aspect 2: The method of Aspect 1, wherein the end-to-end link quality between the neighbor cell and the UE is associated with one or more measurements related to a backhaul link between the neighbor cell and the NCR node.

Aspect 3: The method of any of Aspects 1-2, wherein the end-to-end link quality between the neighbor cell and the UE is associated with one or more measurements related to an access link between the NCR node and the UE.

Aspect 4: The method of any of Aspects 1-3, wherein the end-to-end link quality between the neighbor cell and the UE is associated with one or more of a gain that the NCR node applies to forwarded RF signals or a transmit power that the NCR node applies to forwarded RF signals.

Aspect 5: The method of any of Aspects 1-4, wherein the end-to-end link quality is associated with an access beam that the NCR node uses to communicate with the UE.

Aspect 6: The method of any of Aspects 1-5, wherein the end-to-end link quality is associated with a backhaul beam that the NCR node uses to communicate with the neighbor cell.

Aspect 7: The method of any of Aspects 1-6, further comprising: sending, to the neighbor cell, a handover request message to request the handover of the UE to the neighbor cell.

Aspect 8: The method of any of Aspects 1-7, further comprising: sending, to the neighbor cell, one or more parameters related to the end-to-end link quality between the neighbor cell and the UE.

Aspect 9: A method of wireless communication performed by a network node, comprising: receiving, from an NCR node, one or more parameters related to an end-to-end link quality between a neighbor cell in communication with the NCR node and a UE in communication with the NCR node; estimating the end-to-end link quality between the neighbor cell and the UE in accordance with the one or more parameters; and transmitting, to the NCR node, control information to trigger a handover of the UE to the neighbor cell responsive to the estimated end-to-end link quality between the neighbor cell and the UE.

Aspect 10: The method of Aspect 9, wherein the one or more parameters related to the end-to-end link quality between the neighbor cell and the UE include one or more measurements related to a backhaul link between the neighbor cell and the NCR node.

Aspect 11: The method of any of Aspects 9-10, wherein the one or more parameters related to the end-to-end link quality between the neighbor cell and the UE include one or more measurements related to an access link between the NCR node and the UE.

Aspect 12: The method of any of Aspects 9-11, wherein the one or more parameters related to the end-to-end link quality between the neighbor cell and the UE include one or more of a gain that the NCR node applies to forwarded RF signals or a transmit power that the NCR node applies to forwarded RF signals.

Aspect 13: The method of any of Aspects 9-12, wherein the end-to-end link quality is estimated for an access beam that the NCR node uses to communicate with the UE.

Aspect 14: The method of any of Aspects 9-13, wherein the end-to-end link quality is estimated for a backhaul beam that the NCR node uses to communicate with the neighbor cell.

Aspect 15: The method of any of Aspects 9-14, further comprising: sending, to the neighbor cell, a handover request message to request the handover of the UE to the neighbor cell.

Aspect 16: The method of any of Aspects 9-15, further comprising: sending, to the neighbor cell, information indicating the one or more parameters related to the end-to-end link quality between the neighbor cell and the UE.

Aspect 17: An apparatus for wireless communication at a device, comprising a processor; memory coupled with the processor; and instructions stored in the memory and executable by the processor to cause the apparatus to perform the method of one or more of Aspects 1-16.

Aspect 18: A device for wireless communication, comprising a memory and one or more processors coupled to the memory, the one or more processors configured to perform the method of one or more of Aspects 1-16.

Aspect 19: An apparatus for wireless communication, comprising at least one means for performing the method of one or more of Aspects 1-16.

Aspect 20: A non-transitory computer-readable medium storing code for wireless communication, the code comprising instructions executable by a processor to perform the method of one or more of Aspects 1-16.

Aspect 21: A non-transitory computer-readable medium storing a set of instructions for wireless communication, the set of instructions comprising one or more instructions that, when executed by one or more processors of a device, cause the device to perform the method of one or more of Aspects 1-16.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware or a combination of hardware and at least one of software or firmware. "Software" shall be construed broadly to mean instructions, instruction sets, code, code segments, program code, programs, subprograms, software modules, applications, software applications, software packages, routines, subroutines, objects, executables, threads of execution, procedures, or functions, among other examples, whether referred to as software, firmware, middleware, microcode, hardware description language, or otherwise. As used herein, a "processor" is implemented in hardware or a combination of hardware and software. It will be apparent that systems or methods described herein may be implemented in different forms of hardware or a combination of hardware and software. The actual specialized control hardware or software code used to implement these systems or methods is not limiting of the aspects. Thus, the operation and behavior of the systems or methods are described herein without reference to specific software code, because those skilled in the art will understand that software and hardware can be designed to implement the systems or methods based, at least in part, on the description herein. A component being configured to perform a function means that the component has a capability to perform the function, and does not require the function to be actually performed by the component, unless noted otherwise.

As used herein, "satisfying a threshold" may, depending on the context, refer to a value being greater than the threshold, greater than or equal to the threshold, less than the threshold, less than or equal to the threshold, equal to the threshold, or not equal to the threshold, among other examples.

As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (for example, a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," and similar terms are intended to be open-ended terms that do not limit an element that they modify (for example, an element "having" A may also have B). Further, the phrase "based on" is intended to mean "based on or otherwise in association with" unless explicitly stated otherwise. Also, as used herein, the term "or" is intended to be inclusive when used in a series and may be used interchangeably with "and/or," unless explicitly stated otherwise (for example, if used in combination with "either" or "only one of"). It should be understood that "one or more" is equivalent to "at least one."

Even though particular combinations of features are recited in the claims or disclosed in the specification, these combinations are not intended to limit the disclosure of various aspects. Many of these features may be combined in ways not specifically recited in the claims or disclosed in the specification. The disclosure of various aspects includes each dependent claim in combination with every other claim in the claim set.

What is claimed is:

1. A network node, comprising:
   a processing system that includes processor circuitry and memory circuitry coupled with the processor circuitry, the processing system configured to cause the network node to:
   receive, from a network-controlled repeater (NCR) node, information that indicates an end-to-end link quality between a neighbor cell in communication with the NCR node and a user equipment (UE) in communication with the NCR node;
   transmit, to the NCR node, control information to trigger a handover of the UE to the neighbor cell responsive to the information that indicates the end-to-end link quality between the neighbor cell and the UE; and
   send, to the neighbor cell, a handover request message that includes one or more of a gain of the NCR node or a transmit power of the NCR node.

2. The network node of claim 1, wherein the end-to-end link quality between the neighbor cell and the UE is associated with one or more measurements related to a backhaul link between the neighbor cell and the NCR node.

3. The network node of claim 1, wherein the end-to-end link quality between the neighbor cell and the UE is associated with one or more measurements related to an access link between the NCR node and the UE.

4. The network node of claim 1, wherein the end-to-end link quality between the neighbor cell and the UE is associated with one or more of the gain or the transmit power, wherein the gain is applied by the NCR node to forwarded radio frequency (RF) signals, and wherein the transmit power is applied by the NCR node to the forwarded RF signals.

5. The network node of claim 1, wherein the end-to-end link quality is associated with an access beam that the NCR node uses to communicate with the UE.

6. The network node of claim 1, wherein the end-to-end link quality is associated with a backhaul beam that the NCR node uses to communicate with the neighbor cell.

7. The network node of claim 1, wherein the handover request message requests the handover of the UE to the neighbor cell, and wherein the handover request message includes the transmit power.

8. The network node of claim 1, wherein the processing system is further configured to cause the network node to:
   send, to the neighbor cell, one or more parameters related to the end-to-end link quality between the neighbor cell and the UE.

9. A network node, comprising:

a processing system that includes processor circuitry and memory circuitry coupled with the processor circuitry, the processing system configured to cause the network node to:

receive, from a network-controlled repeater (NCR) node, one or more parameters related to an end-to-end link quality between a neighbor cell in communication with the NCR node and a user equipment (UE) in communication with the NCR node;

estimate the end-to-end link quality between the neighbor cell and the UE in accordance with the one or more parameters;

transmit, to the NCR node, control information to trigger a handover of the UE to the neighbor cell responsive to the estimated end-to-end link quality between the neighbor cell and the UE; and send, to the neighbor cell, a handover request message that includes one or more of a gain of the NCR node or a transmit power of the NCR node.

10. The network node of claim 9, wherein the one or more parameters related to the end-to-end link quality between the neighbor cell and the UE include one or more measurements related to a backhaul link between the neighbor cell and the NCR node.

11. The network node of claim 9, wherein the one or more parameters related to the end-to-end link quality between the neighbor cell and the UE include one or more measurements related to an access link between the NCR node and the UE.

12. The network node of claim 9, wherein the one or more parameters related to the end-to-end link quality between the neighbor cell and the UE include one or more of the gain or the transmit power, wherein the gain is applied by the NCR node to forwarded radio frequency (RF) signals, and wherein the transmit power is applied by the NCR node to the forwarded RF signals.

13. The network node of claim 9, wherein the end-to-end link quality is estimated for an access beam that the NCR node uses to communicate with the UE.

14. The network node of claim 9, wherein the end-to-end link quality is estimated for a backhaul beam that the NCR node uses to communicate with the neighbor cell.

15. The network node of claim 9, wherein the handover request message requests the handover of the UE to the neighbor cell, and wherein the handover request message includes the transmit power.

16. The network node of claim 9, wherein the processing system is further configured to cause the network node to:

send, to the neighbor cell, information indicating the one or more parameters related to the end-to-end link quality between the neighbor cell and the UE.

17. A method for wireless communication by a network node, comprising:

receiving, from a network-controlled repeater (NCR) node, information that indicates an end-to-end link quality between a neighbor cell in communication with the NCR node and a user equipment (UE) in communication with the NCR node;

transmitting, to the NCR node, control information to trigger a handover of the UE to the neighbor cell responsive to the information that indicates the end-to-end link quality between the neighbor cell and the UE; and sending, to the neighbor cell, a handover request message that includes one or more of a gain of the NCR node or a transmit power of the NCR node.

18. The method of claim 17, wherein the end-to-end link quality between the neighbor cell and the UE is associated with one or more measurements related to a backhaul link between the neighbor cell and the NCR node, one or more measurements related to an access link between the NCR node and the UE, the gain, or the transmit power.

19. The method of claim 17, wherein the end-to-end link quality is associated with one or more of an access beam that the NCR node uses to communicate with the UE or a backhaul beam that the NCR node uses to communicate with the neighbor cell.

20. The method of claim 17, wherein the handover request message requests the handover of the UE to the neighbor cell, and wherein the handover request message includes the transmit power.

* * * * *